(12) United States Patent
Kloepfer et al.

(10) Patent No.: US 12,022,796 B2
(45) Date of Patent: Jul. 2, 2024

(54) LIVESTOCK TRANSPORT CONTAINER

(71) Applicant: Titan Trailers Inc., Delhi (CA)

(72) Inventors: Michael Kloepfer, Delhi (CA); Dan Cohoe, Burgessville (CA); Bryan Morris Bracewell, Woodstock (CA); Andrew Joseph Maertens, Delhi (CA)

(73) Assignee: Titan Trailers Inc., Delhi (CA)

( * ) Notice: Subject to any disclaimer, the term of this patent is extended or adjusted under 35 U.S.C. 154(b) by 0 days.

(21) Appl. No.: 18/227,620

(22) Filed: Jul. 28, 2023

(65) Prior Publication Data
US 2023/0380376 A1 Nov. 30, 2023

Related U.S. Application Data

(63) Continuation of application No. 17/766,196, filed as application No. PCT/CA2020/051302 on Sep. 30, 2020, now Pat. No. 11,751,531.
(Continued)

(51) Int. Cl.
| | | |
|---|---|---|
| *A01K 1/00* | (2006.01) | |
| *B60P 3/04* | (2006.01) | |
| *B62D 33/04* | (2006.01) | |

(52) U.S. Cl.
CPC .............. *A01K 1/0035* (2013.01); *B60P 3/04* (2013.01); *B62D 33/042* (2013.01)

(58) Field of Classification Search
CPC ...... A01K 3/00; A01K 1/0035; A01K 1/0236; B60P 3/04; B62D 33/042
See application file for complete search history.

(56) References Cited

U.S. PATENT DOCUMENTS

| 5,375,534 A | 12/1994 | Adams |
|---|---|---|
| 6,450,125 B2 | 9/2002 | McElroy |
| (Continued) | | |

FOREIGN PATENT DOCUMENTS

| CN | 204095632 U | 1/2015 |
|---|---|---|
| CN | 106740391 A | 5/2017 |
| (Continued) | | |

OTHER PUBLICATIONS

"Aan de slag bij Cuppers Carrosserieën | Seesing Personeel," Seesing Flex, YouTube video dated May 3, 2018, https://youtu.be/WYT9nKLHe4s (1 page screenshot of time stamp 1:05).
(Continued)

*Primary Examiner* — Ebony E Evans
(74) *Attorney, Agent, or Firm* — McCarter & English, LLP

(57) ABSTRACT

A livestock container has a plurality of levels and compartments formed by a plurality of convertible platforms and compartment gates. In some embodiments, the convertible platforms are bi-fold platforms hingedly mounted to sidewalls of the container and moveable between deployed and stored positions. When in the stored positions, the convertible platforms extend minimally from the sidewall, eliminating or reducing obstacles to movement of livestock or humans. The convertible platforms are configured to rest on upper edges of corresponding compartment gates below, and the container may be free of any central post, thereby eliminating obstacles caused thereby to movement of livestock or humans. The sidewalls and floor may be formed of hollow-core extruded aluminum panels, and longitudinal channels formed therein may house pipes or electrical wires for conducting water or electricity to ventilation fans, lights, or misters, or for storing water.

15 Claims, 32 Drawing Sheets

Related U.S. Application Data

(60) Provisional application No. 62/910,506, filed on Oct. 4, 2019.

(56) References Cited

U.S. PATENT DOCUMENTS

| | | | |
|---|---|---|---|
| 6,585,306 | B1 | 7/2003 | Smith et al. |
| 2006/0255609 | A1* | 11/2006 | Squyres ............... B60P 1/00 296/24.44 |
| 2007/0102960 | A1 | 5/2007 | Booher |
| 2007/0251462 | A1 | 11/2007 | Harris et al. |
| 2010/0236490 | A1* | 9/2010 | Sebastia ............ B60P 1/4457 119/407 |
| 2017/0267153 | A1* | 9/2017 | Novero ................ B60P 3/04 |
| 2019/0254259 | A1* | 8/2019 | Waid ................ A01K 45/005 |
| 2021/0086682 | A1 | 3/2021 | Zanassi |
| 2022/0394948 | A1 | 12/2022 | Kloepfer et al. |

FOREIGN PATENT DOCUMENTS

| | | |
|---|---|---|
| CN | 110194097 A | 9/2019 |
| FR | 2916846 A1 | 12/2008 |
| GB | 2393428 A | 3/2004 |

OTHER PUBLICATIONS

International Search Report and Written Opinion of the International Searching Authority mailed Nov. 25, 2020, in connection with International Appln. No. PCT/CA2020/051302 (10 pages).

International Preliminary Report on Patentability dated Aug. 2, 2021, in connection with International Appln. No. PCT/CA2020/051302, including annexed Response to Written Opinion and Amendment under PCT Article 34 (29 pages).

Office Action dated Jan. 4, 2023, issued in connection wih U.S. Appl. No. 17/766,196 (15 pages).

Notice of Allowance dated May 1, 2023, issued in connection wih U.S. Appl. No. 17/766,196 (8 pages).

Extended European Search Report dated Oct. 20, 2023, issued in connection with European Application No. 20872830.3 (10 pages).

* cited by examiner

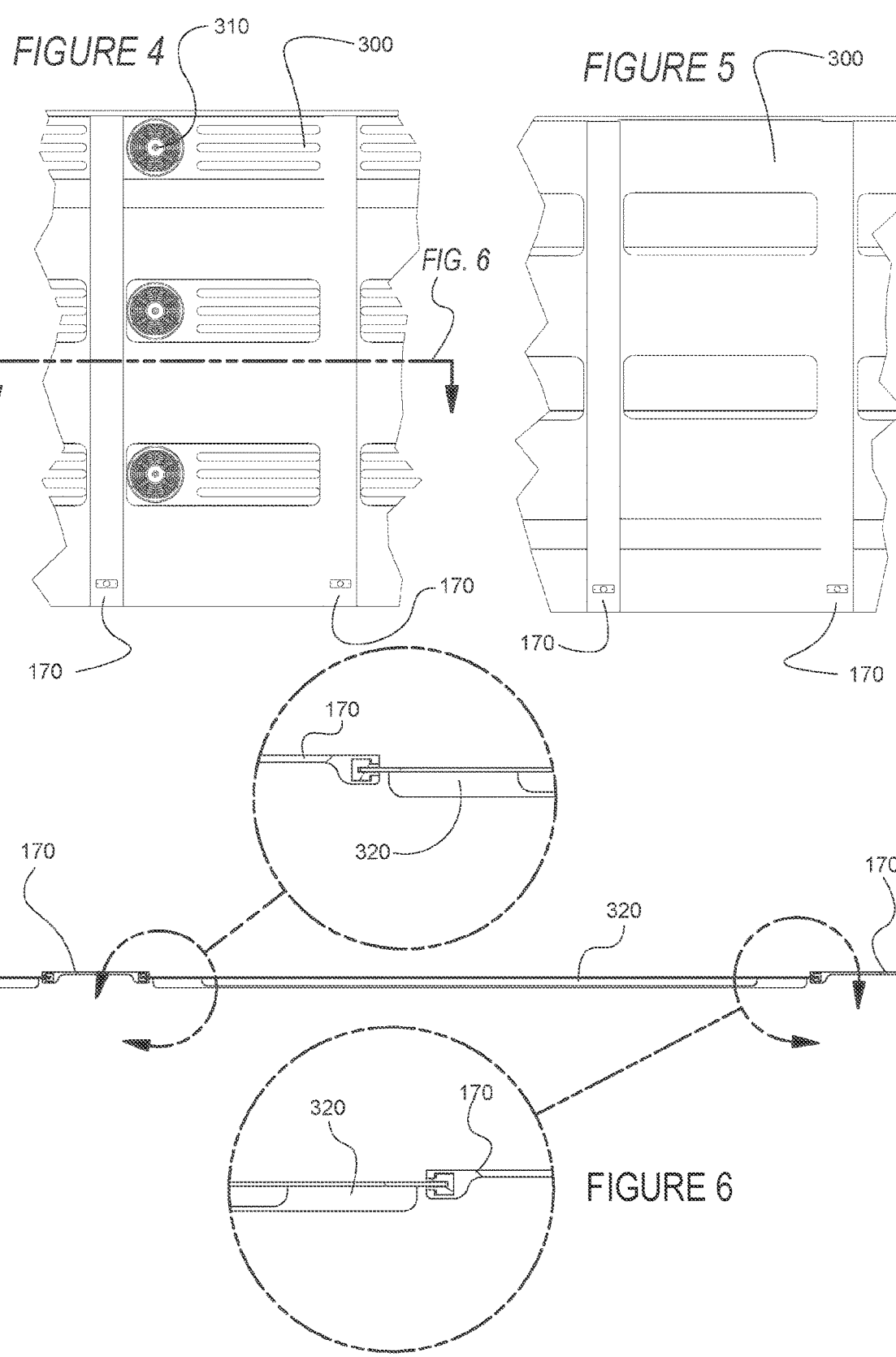

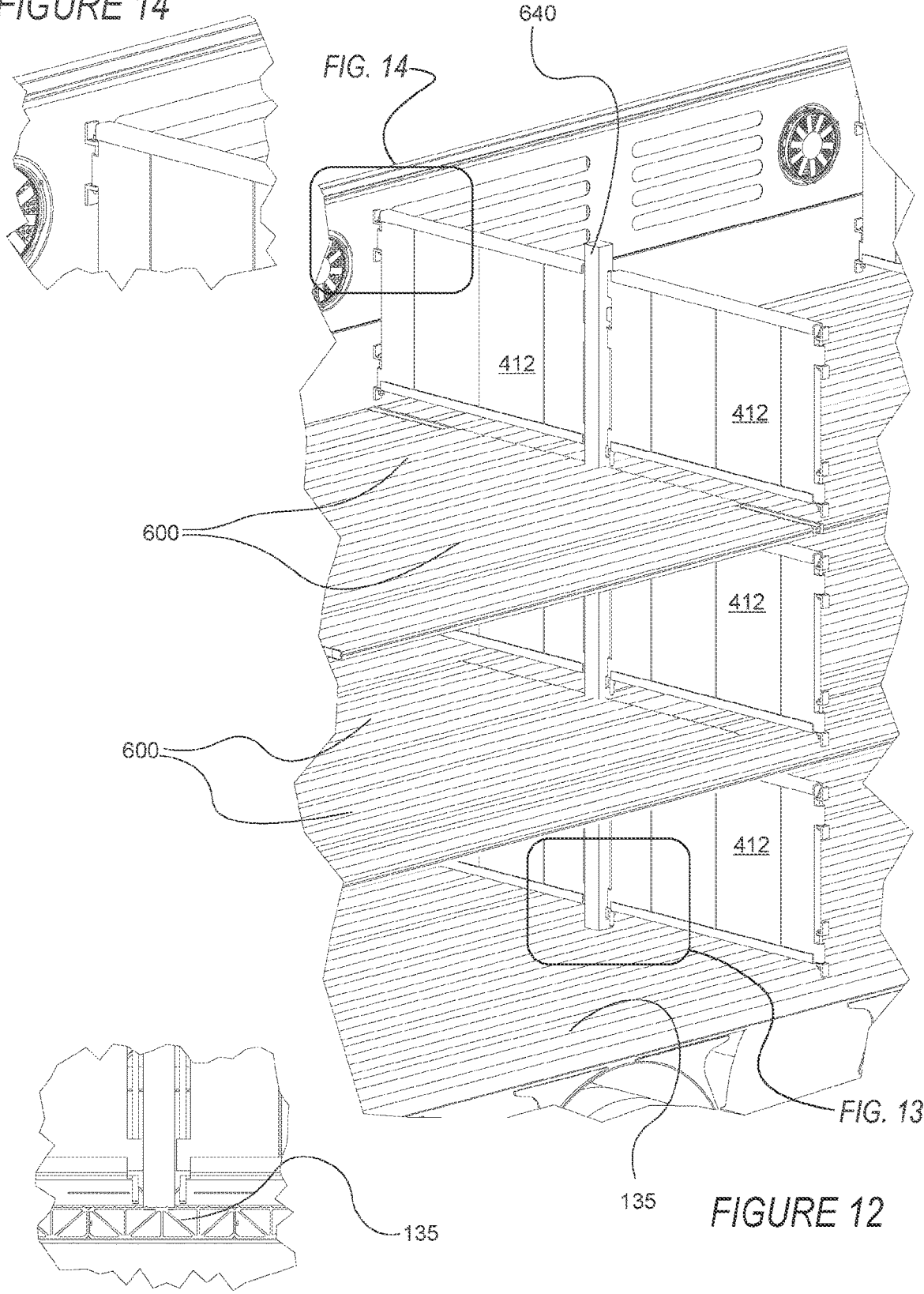

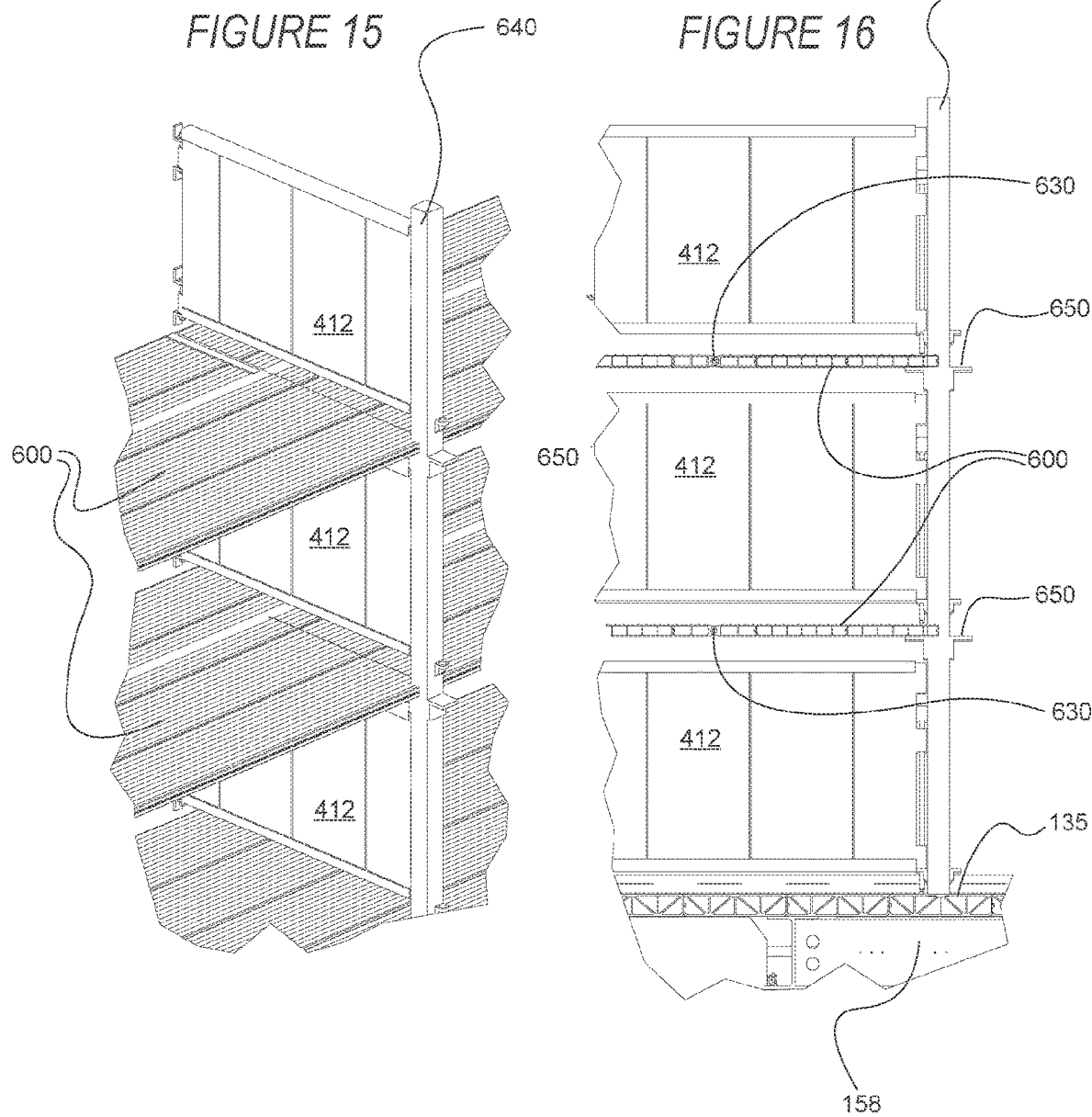

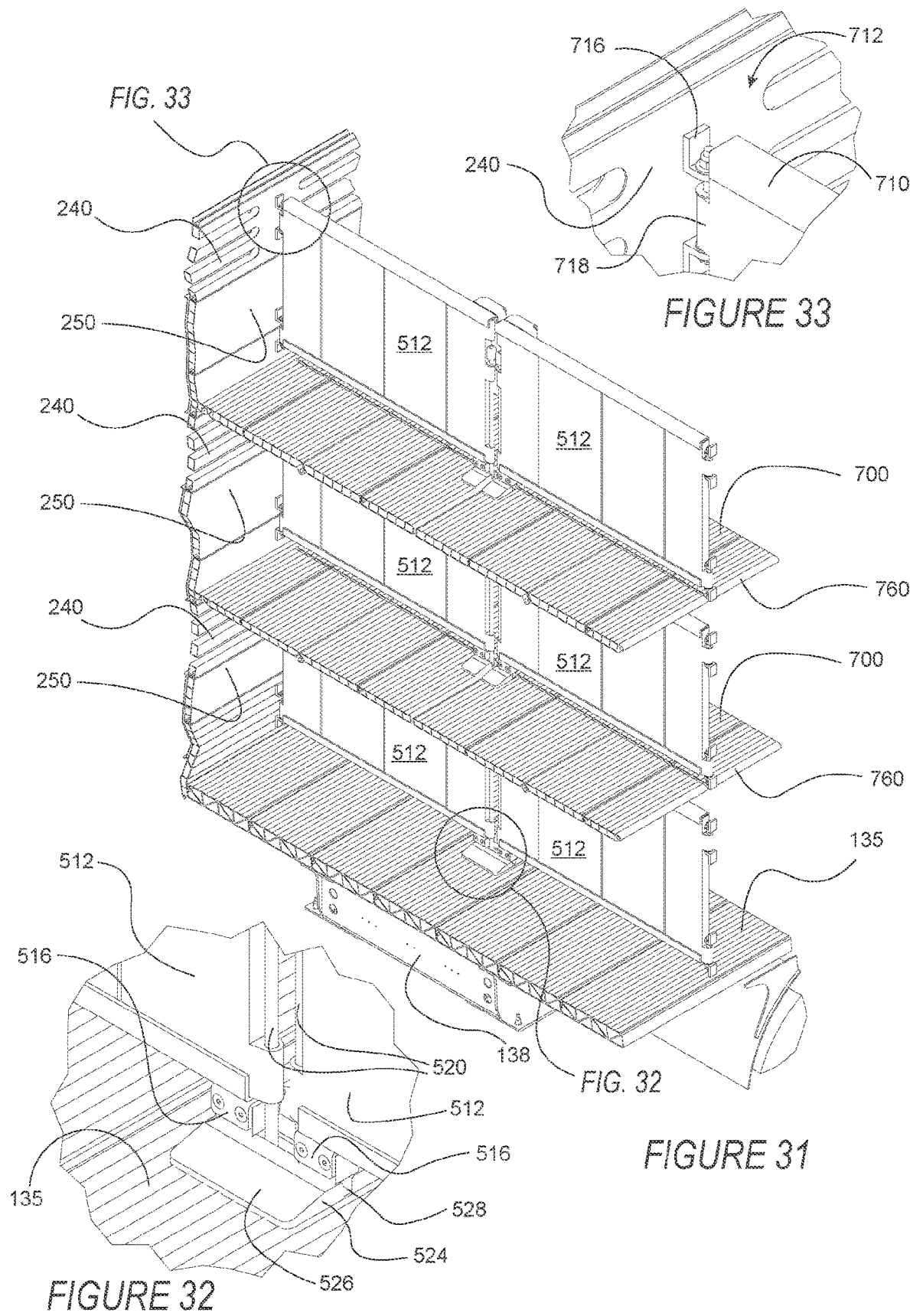

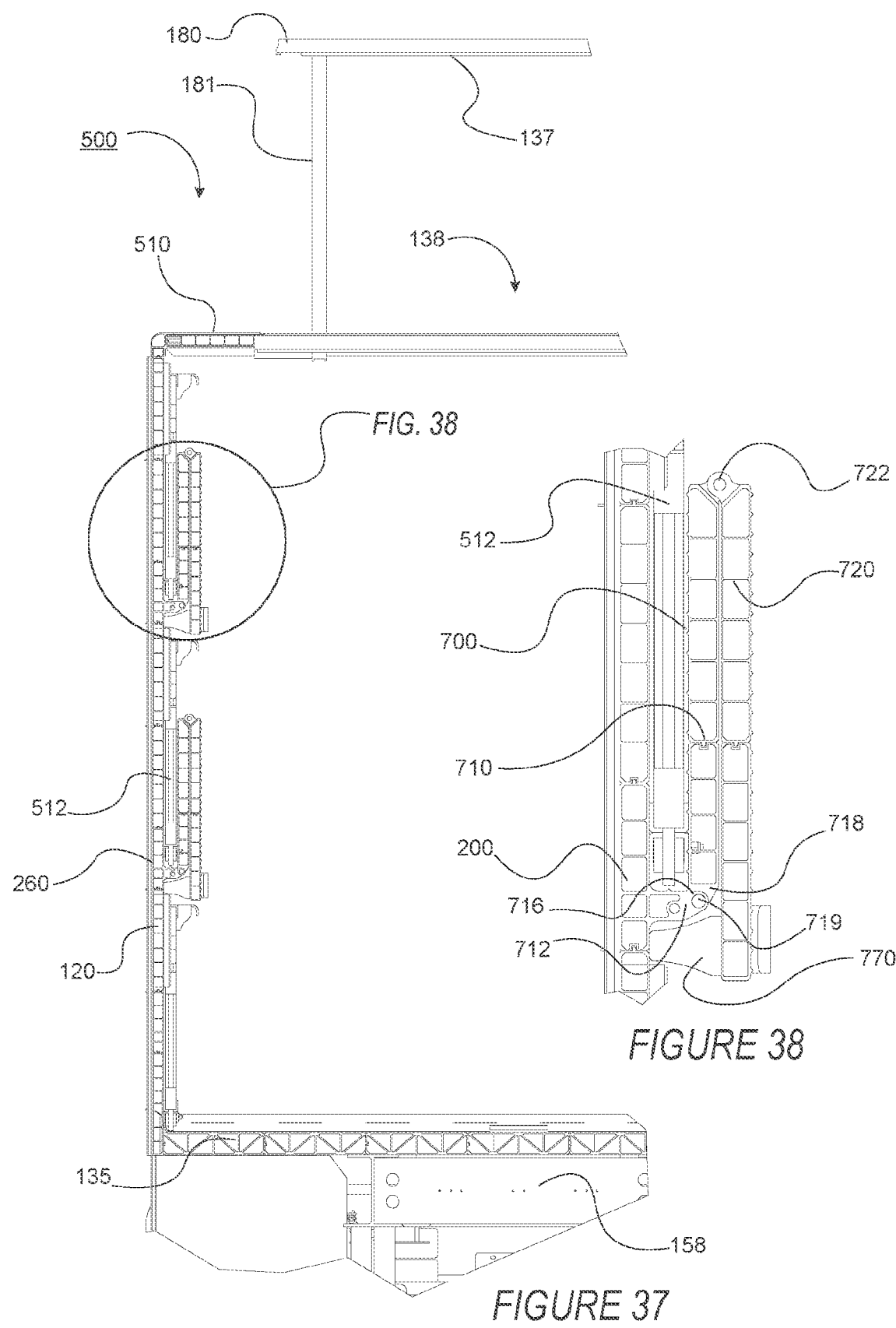

LIVESTOCK TRANSPORT CONTAINER

RELATED APPLICATIONS

The present application is a continuation of, and claims benefit of priority to, U.S. patent application Ser. No. 17/766,196 filed on Apr. 1, 2022, which is a U.S. National Phase application under 35 U.S.C. § 371 of International Application No. PCT/CA2020/051302 filed on Sep. 30, 2020, which claims the benefit of priority to U.S. Provisional Patent Application Ser. No. 62/910,506 filed on Oct. 4, 2019, the entire disclosures of which are all expressly incorporated by reference herein.

FIELD

The present disclosure relates generally to livestock transport containers, livestock trailers, and livestock railcars for transporting livestock.

BACKGROUND

Livestock containers, such as those forming a part of livestock trailers and livestock railcars, are widely used for the transport of livestock, such as cattle, pigs, sheep, and horses, on roads, highways, and railroads.

As with all cargo containers, it is desirable to configure livestock containers to maximize the amount of transportable livestock, but also to minimize the overall weight and optimize the aerodynamic profile of the container in order to minimize fuel consumption. As compared to other types of cargo, livestock trailers are also desirably configured to maximize the safety and health of the livestock to be transported, whether during transport, loading, or unloading. Moreover, many jurisdictions impose regulations on livestock containers to ensure the safety and well-being of the transported livestock.

Livestock containers are conventionally formed from rigid materials such as sheet metal and other metal members. They are typically formed with openings in one or more locations of the sidewalls or end walls to provide ventilation and permit entry of ambient light.

There remains an ongoing need for improvements in livestock containers for use in livestock trailers and railcars, including improvements which improve the capacity, fuel economy, and construction costs and conditions, while also facilitating use and maximizing the health and well-being of the transported livestock.

BRIEF DESCRIPTION OF THE DRAWINGS

Embodiments will now be described, by way of example only, with reference to the attached Figures.

FIG. 4 shows a partial view of the sidewall of FIG. 2 with covers in an open position, and FIG. 5 shows the partial view with covers in a closed position.

FIG. 6 shows a cross-sectional view from FIG. 4 illustrating slide mounting of the covers.

FIG. 12 shows an interior perspective view of the trailer of FIG. 7 to illustrate an arrangement of the compartment gates and convertible platforms when in closed and deployed positions, respectively.

FIG. 13 is a partial view drawn from FIG. 12 showing an arrangement of the central pole with the floor of the trailer.

FIG. 14 is a partial view drawn from FIG. 12 showing an arrangement of a hinge mounting of a compartment gate to a sidewall of the container.

FIG. 15 is a perspective, isolated view of the compartment gates, convertible platforms, and central pole of FIG. 12.

FIG. 16 is a corresponding end, cross-sectional view.

FIG. 31 shows an interior perspective view of the trailer of FIG. 25 to illustrate an arrangement of the compartment gates and convertible platforms when in closed and deployed positions, respectively.

FIG. 32 is a partial view drawn from FIG. 31 showing an arrangement of a foot, retention rod, and retention foot.

FIG. 33 is a partial view drawn from FIG. 31 showing an arrangement of a hinge mounting of a compartment gate to a sidewall of the container.

FIG. 37 is a partial, cross-sectional view of the trailer of FIG. 25 showing all convertible platforms in stored positions, and all compartment gates in the open position.

FIG. 38 is an expanded view illustrating an arrangement of the convertible platforms and compartment gates in the stored and open positions, respectively.

Figure 1:
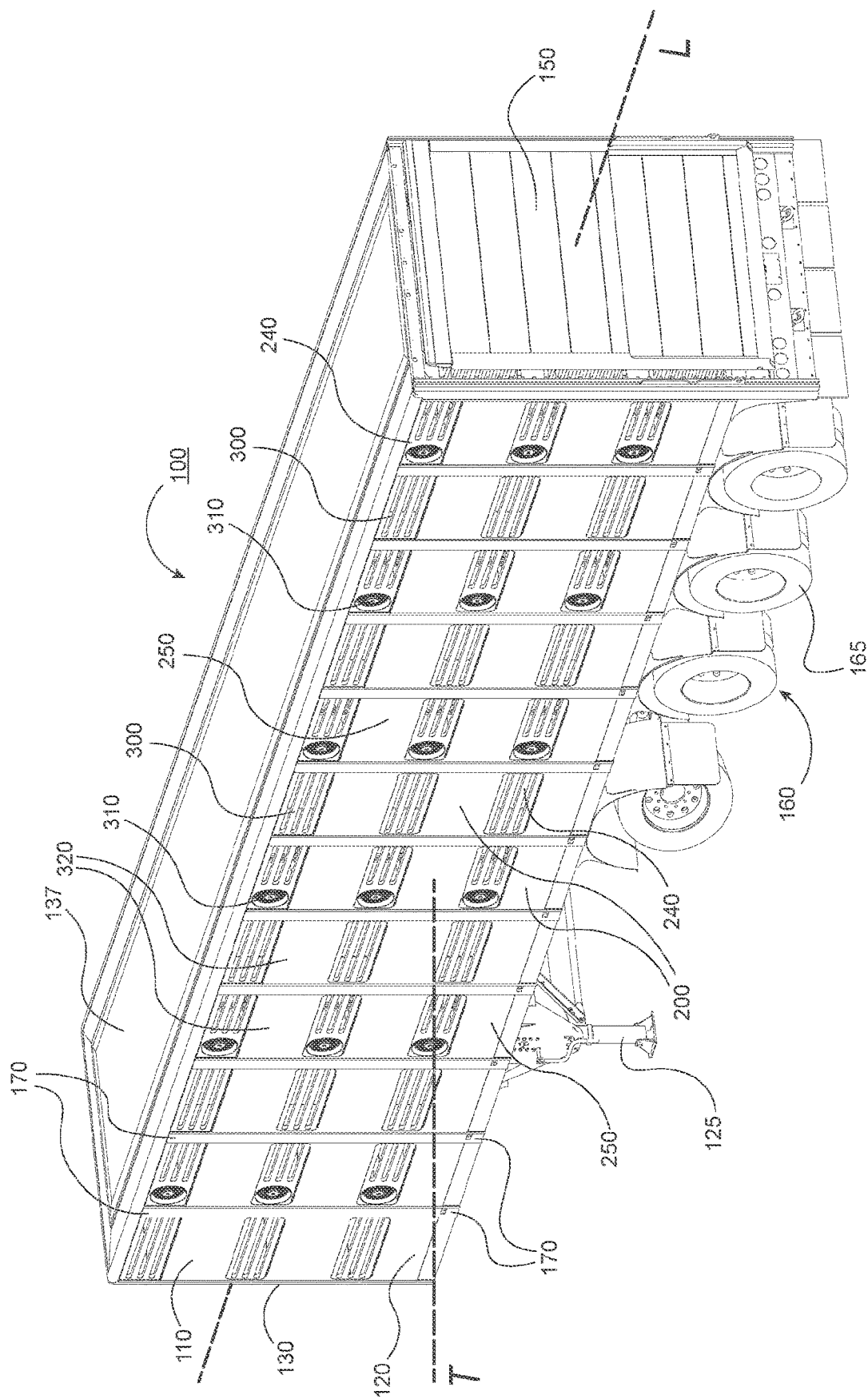
FIG. 1 shows a perspective view of an exterior of a trailer according to embodiments of the invention.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompassed by the corresponding description.

DETAILED DESCRIPTION

Embodiments of an inventive livestock container, livestock trailer, and livestock railcar are disclosed herein.

FIG. 1 shows a livestock trailer 100 having a container 110 with sidewalls 120, a front wall 130, a floor 135, a roof 137, and a rear opening 140 selectively closeable by a tailgate 150. The tailgate 150 may form a ramp 151, which may be an extensible ramp, and may have sideguards 152 for guiding livestock as they move on the ramp 151. The container 110 is mounted to and carried by a chassis 158 which in turn is mounted to and carried by a wheeled suspension 160 including wheels 165 configured for rollably driving the trailer 100 on a supporting surface such as the ground. The trailer 100 may also have landing gear 125 and a truck coupler (not shown) such as a fifth wheel.

The trailer 100 is characterized by a longitudinal axis L which extends parallel to the sidewalls 120, and perpendicular to the front wall 130, and a transverse axis T which extends generally parallel to the front wall 130 and generally perpendicular to the sidewalls 120 and longitude. Thus, when used relative to the container 110 or trailer 100, the adjectives "longitudinal" and "transverse" correspond to the above-defined longitudinal axis L and transverse axis T, respectively. Thus, when used relative to the container 110 or trailer 100, "longitudinal" and derivatives thereof mean along or parallel to the longitudinal axis L, and 'transverse" and derivatives thereof means along or parallel to the transverse axis T. When used relative to the container 110 or trailer 100, the terms "front", "forward", and derivatives thereof mean proximal to or in a direction toward the front wall 130. When used relative to the container 110 or trailer 100, the terms "rear", "rearward", and derivatives thereof mean proximal to or in a direction toward the rear opening 140. When used relative to the container 110 or trailer 100, the terms "bottom", "downward", "lower", and the like are intended to indicate a position relatively proximal to a ground supporting the wheels 165 of the trailer 100, or a direction proceeding generally from the roof 137 of the trailer 100 to the ground. Similarly, when used relative to the container 110 or trailer 100, the terms "top", "upward", "upper", and the like are intended to indicate a position relatively distal from the ground, or a direction proceeding generally from the ground to the roof of the trailer. When used relative to the container 110 or trailer 100, the terms "inward", "inwardly", "inner", and the like are intended to indicate a position or direction relatively proximal to or toward a transverse center of the trailer 100, while terms such as "outward", "outwardly", "outer", and the like are intended to indicate a position or direction relatively distal or away from the transverse center of the trailer 100.

In different embodiments, one or more of the sidewalls 120, front wall 130, floor 135, roof 137, and tailgate 150 are constructed of extruded panels, which may be hollow-core extruded panels, which may be formed from a durable, rigid material, such as metal, such as steel or aluminum, though it will be appreciated that alternative materials and fabrication methods are possible.

In particular, one or more, or each, of the extruded panels forming the container 110 or parts thereof may be longitudinal, oblong extruded panels 200. Each panel may have an outer skin, an inner skin, and a plurality of webs spanning the outer skin and the inner skin. The panels may be formed of any suitable material, which may be a metal, which may be steel or aluminum. The outer skin, the inner skin, and the webs may have any respective dimensions. The following are non-limiting examples. The outer skin may have a thickness of at least 1 mm, or from 1 mm to 4 mm, or from 2 mm to 3 mm, or about 2.5 mm. The inner skin may have a thickness of at least 2 mm, or from 2 mm to 5 mm, or from 3 mm to 4 mm, or about 3.5 mm. The webs may each have a thickness of at least 1 mm, or from 1 mm to 4 mm, or from 2 mm to 3 mm, or about 2.5 mm. The outer skin and the inner skin may be spaced by a gap of at least 30 mm, or from 30 mm to 45 mm, or from 35 mm to 40 mm, or about 38 mm. The webs may be provided in any desired number, which may be at least 6, or 6 to 12, or 8 to 10, or about 9. The webs may be spaced by a gap of at least 15 mm, or 15 mm to 35 mm, or 20 mm to 30 mm, or about 25 mm. Other configurations are possible.

Each panel 200 may be extruded with a tongue at a first longitudinal edge and a groove at a second, transversely opposite longitudinal edge at an opposite end of the arc. The tongues and grooves of the different panels may be configured with respective sizes and shapes to couple fittingly. In this way, a plurality of the panels 200 may be joined at abutting edges by mating the tongue of one panel 200 with the groove of an abutting panel 200 to form a joint, and multiple panels may be so joined in sequence to form the container 110 or part thereof. Each of the joints so formed may be cemented or affixed by any suitable means, which may include fasteners or welds. The panels 200 may be of any desired length, which may include a length which bridges the front wall 130 and rear opening 140—in other words, the entire length of the container 110. All of the panels 200 may have the same length, or first ones of the panels 200 may have a first length different from a second length of second ones of the panels 200. Further combinations are possible.

The longitudinal panels 200 so provided, assembled, joined, and affixed, to form the container 110, may be configured to function as structural members, and provide each panel 200, and the assembled container 110 as a whole, with structural strength and rigidity both along and transverse the longitudinal axes of the container. As such, no further reinforcing means may be required as is typically required by conventional containers. Moreover, due to the lack of any need for such additional structural members, both the inside and the outside surfaces of the container 110 may be made as smooth as possible or with minimal projections. With respect to the outside surface of the container 110, this provides the container with an optimal aerodynamic profile. With respect to the inside surface of the container 110, this completely or maximally reduces the catching, or snagging, or other such impediment to movement of livestock within the container 110 along the inside surface, thereby facilitating loading and unloading of livestock from the container 110.

As shown in FIG. 1, the container 110 may be provided with one or more openings to serve various functions. These may include one or more ventilation slots 300 to provide ventilation and entry of natural light. The container 110 may also include one or more ventilation fans 310 in which case the container 110 may be provided with one or more ventilation fan openings for mounting corresponding ventilation fans 310. In some embodiments one or more of the sidewalls 120 may be formed from a plurality of longitudinal panels 200 including at least one ventilation panel 240 having one or more ventilation slots and/or ventilation fan openings, and at least one spacer panel 250 having no openings. As shown, one or more of the sidewalls 120 may be formed from a plurality of ventilation panels 240 and a plurality of spacer panels 250 in staggered arrangement, such that each ventilation panel 240 is vertical separated from a closest ventilation panel 240 by at least one spacer panel 250. Any suitable selection and arrangement of ventilation panels 240 and spacer panels 250 is possible.

Figure 2:
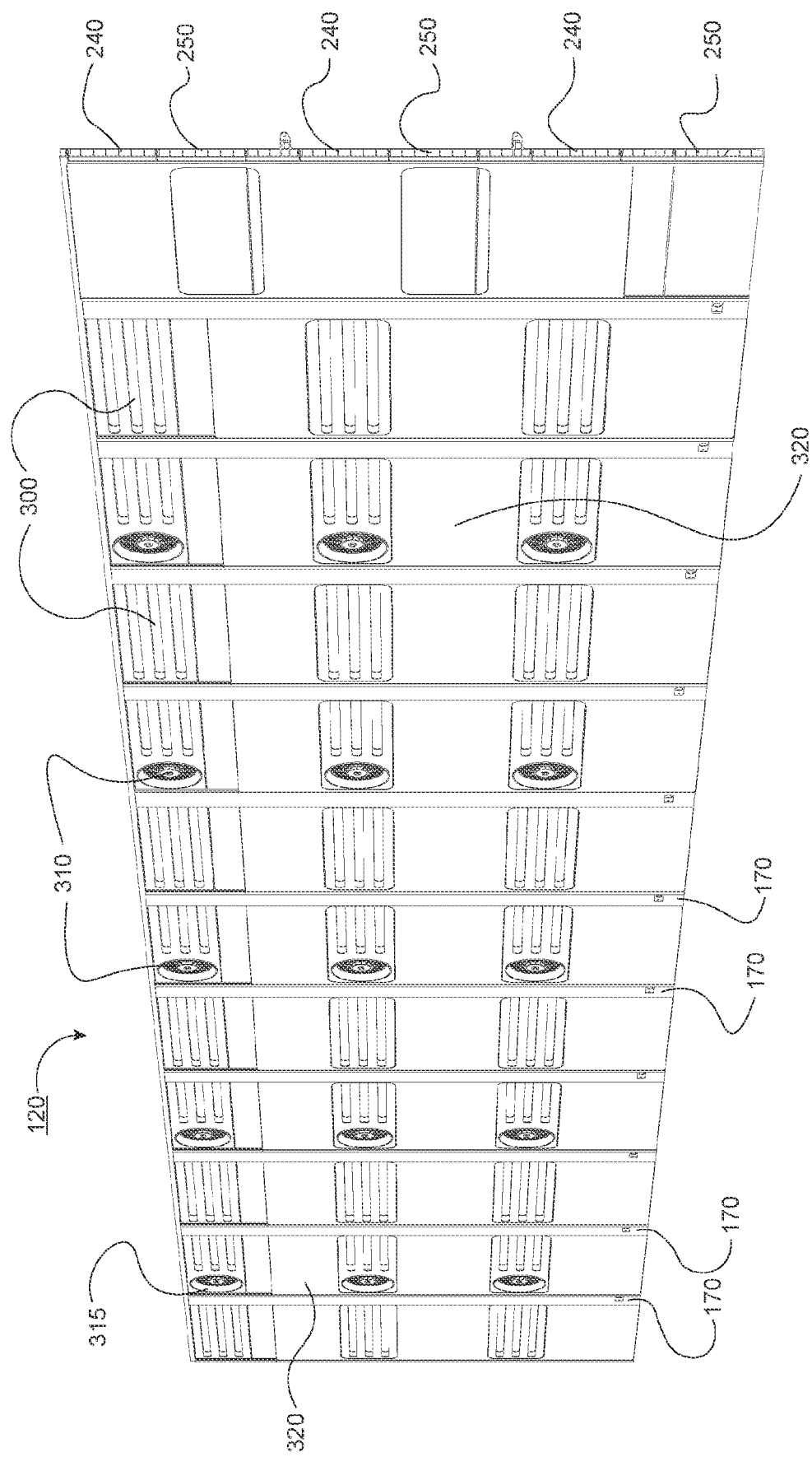
FIG. 2 shows a perspective, view of a sidewall of a trailer according to embodiments of the invention, in isolation.
Figure 3:
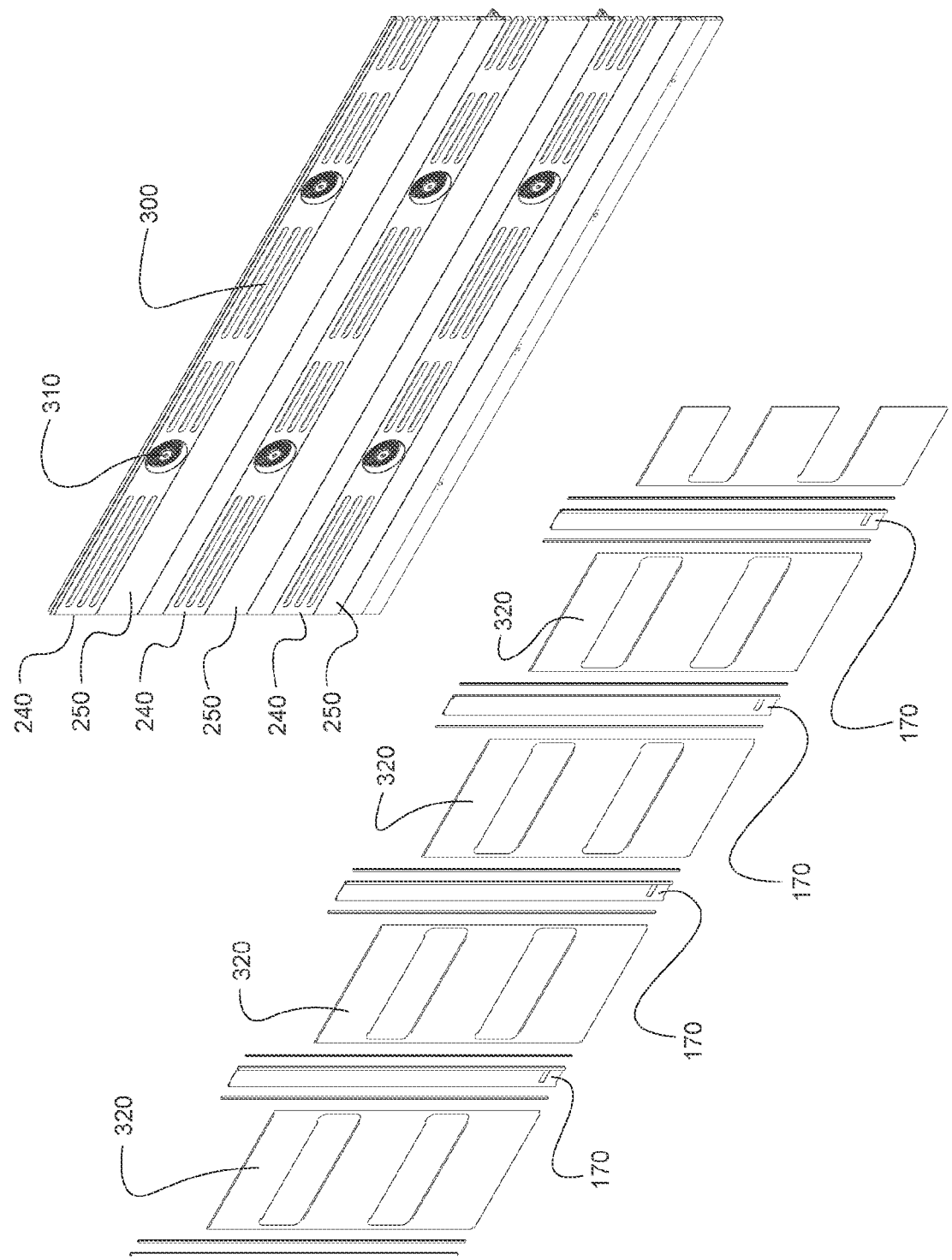
FIG. 3 shows an exploded view of the sidewall of FIG. 2.
Figure 7:
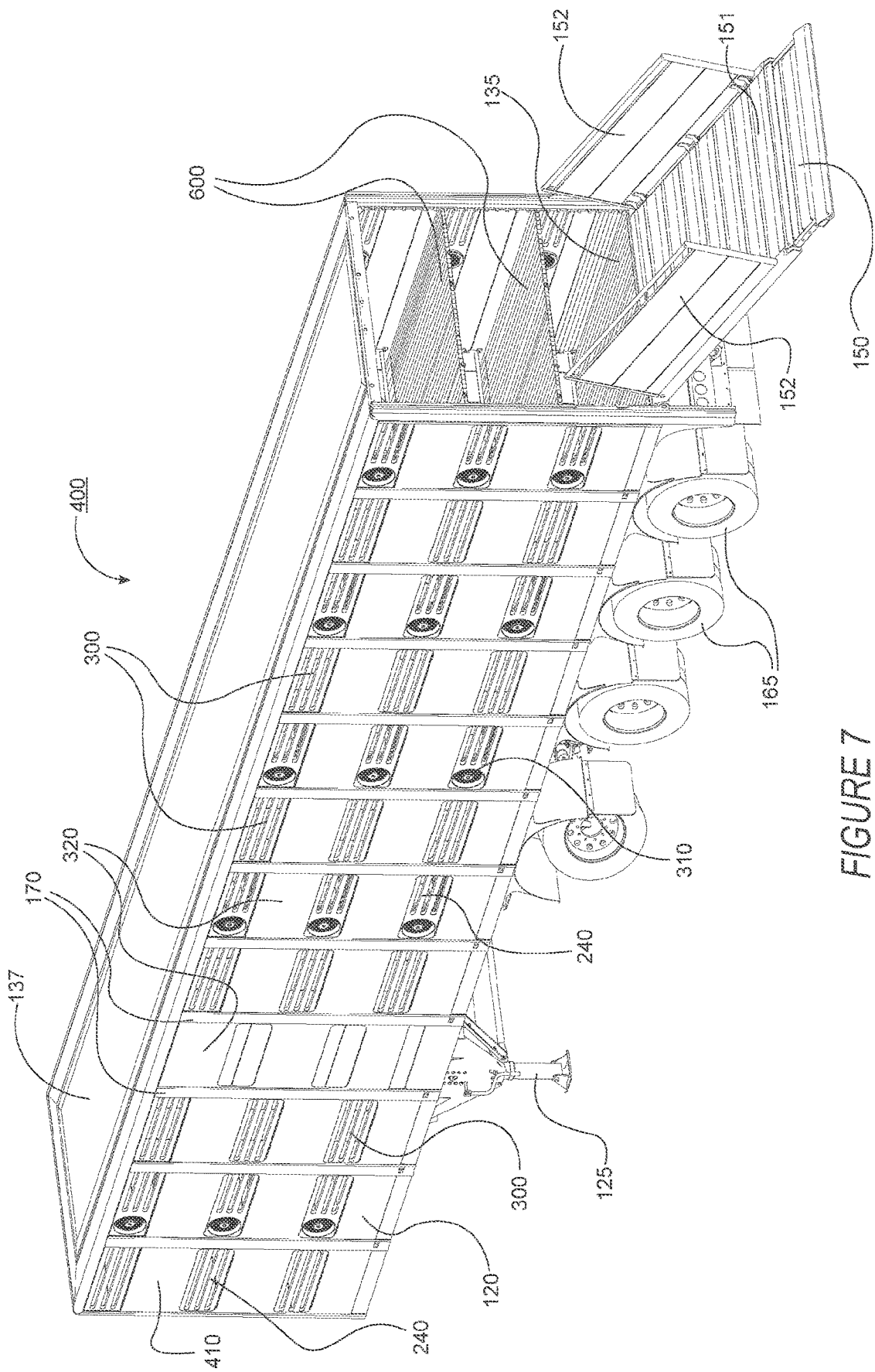
FIG. 7 shows a perspective view of an exterior of a trailer according to a first set of embodiments of the invention, with the tailgate open.
Figure 8:
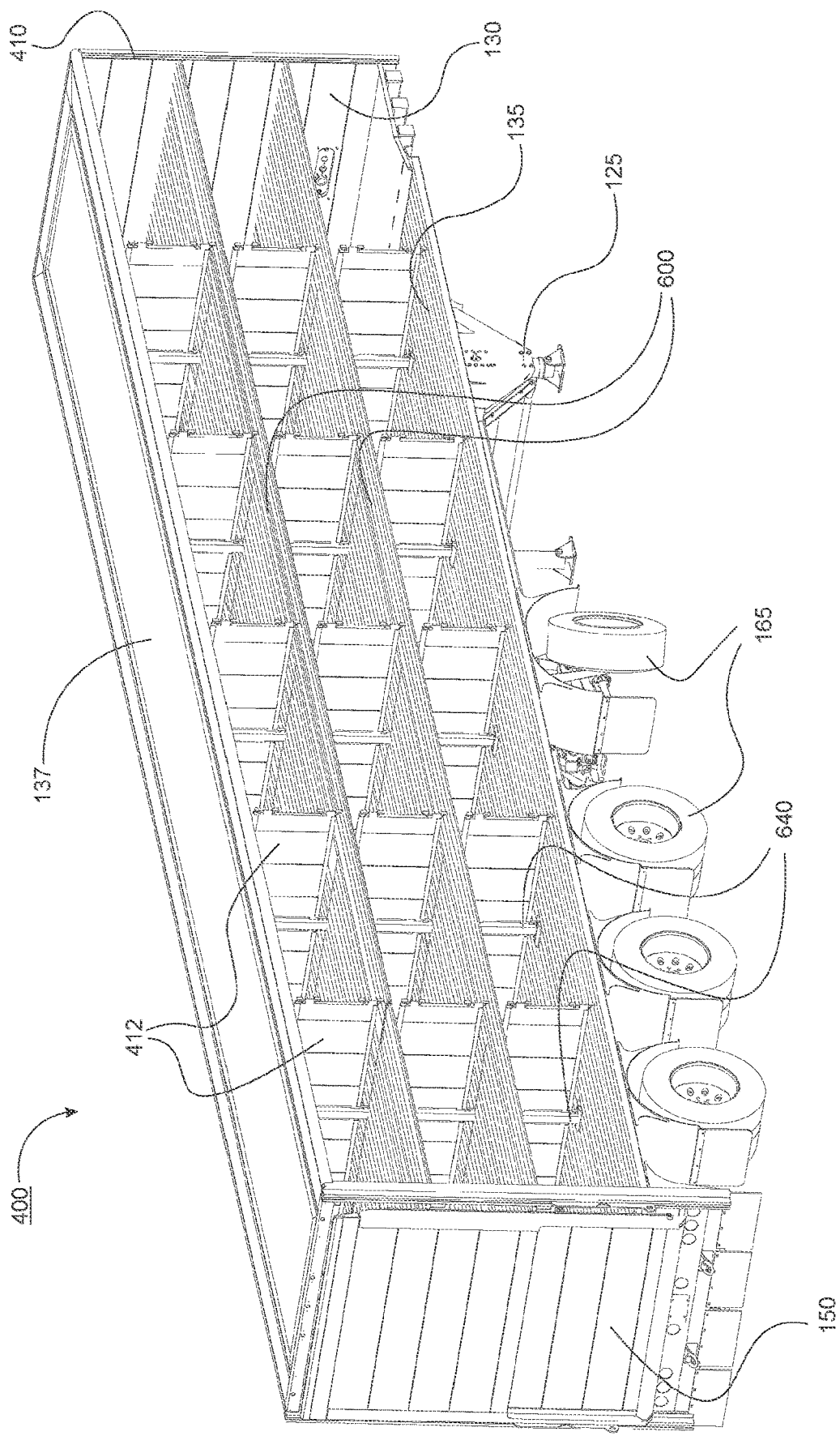
FIG. 8 shows a perspective view of the trailer of FIG. 7, with a sidewall removed to show an interior of the container, with the tailgate and roof in closed positions, all convertible platforms in deployed positions, and all compartment gates in closed positions.
Figure 9:
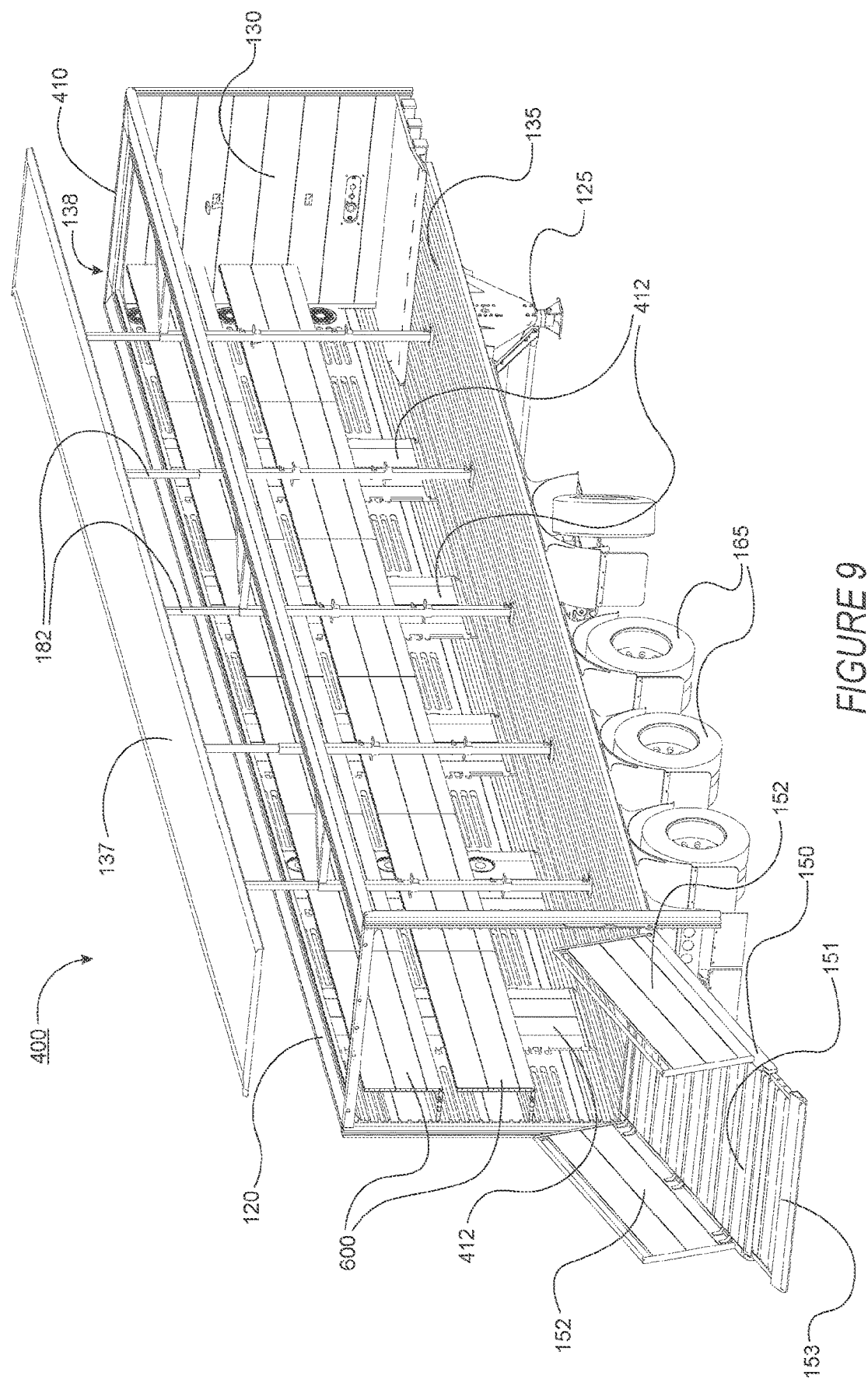
FIG. 9 shows a perspective view of the trailer of FIG. 7, with a sidewall removed to show an interior of the container, with the tailgate and roof in open positions, all convertible platforms in stored positions, and all compartment gates in open positions.
Figure 10:
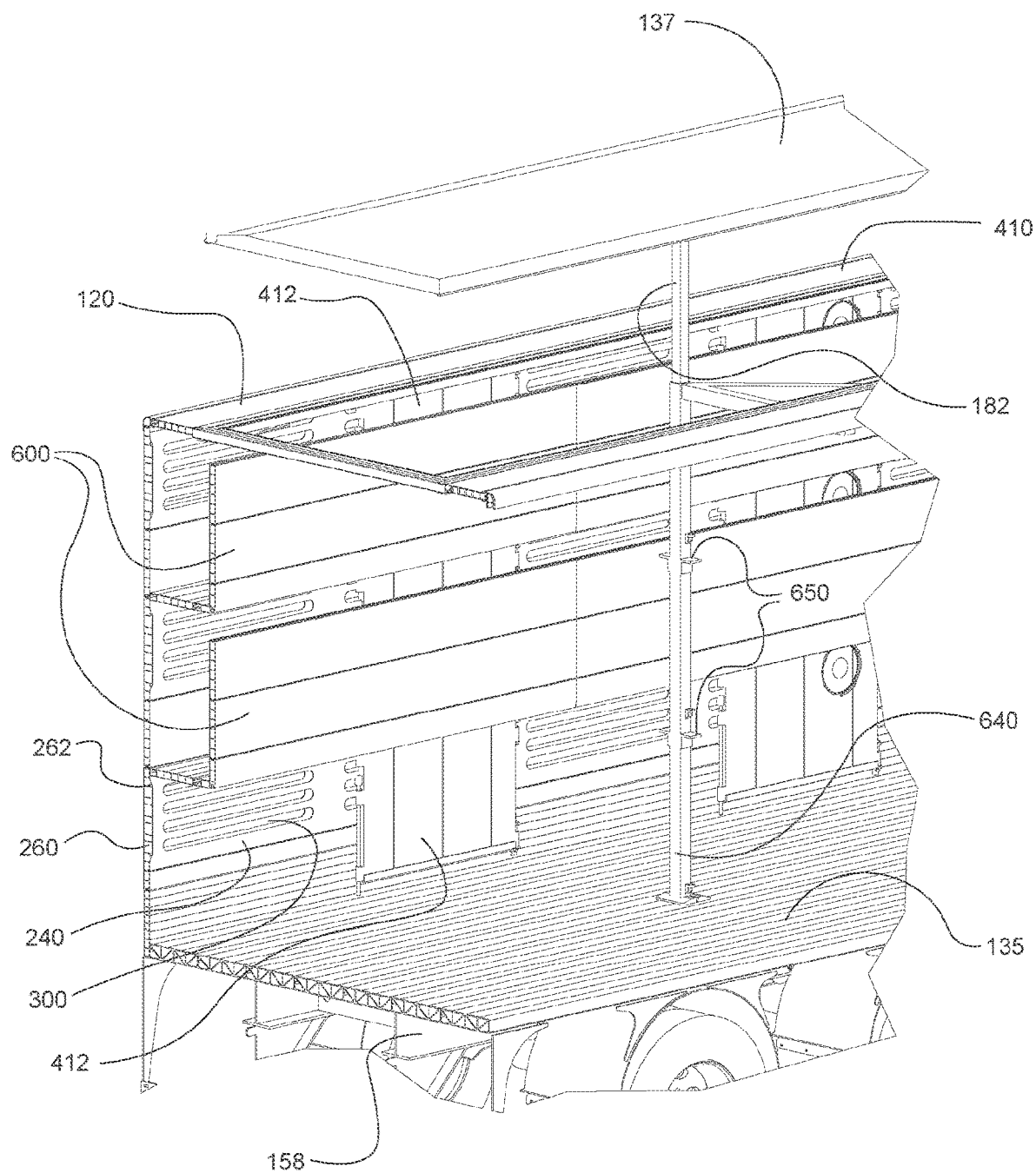
FIG. 10 shows a partial and cross-sectional version of FIG. 9.
Figure 11:
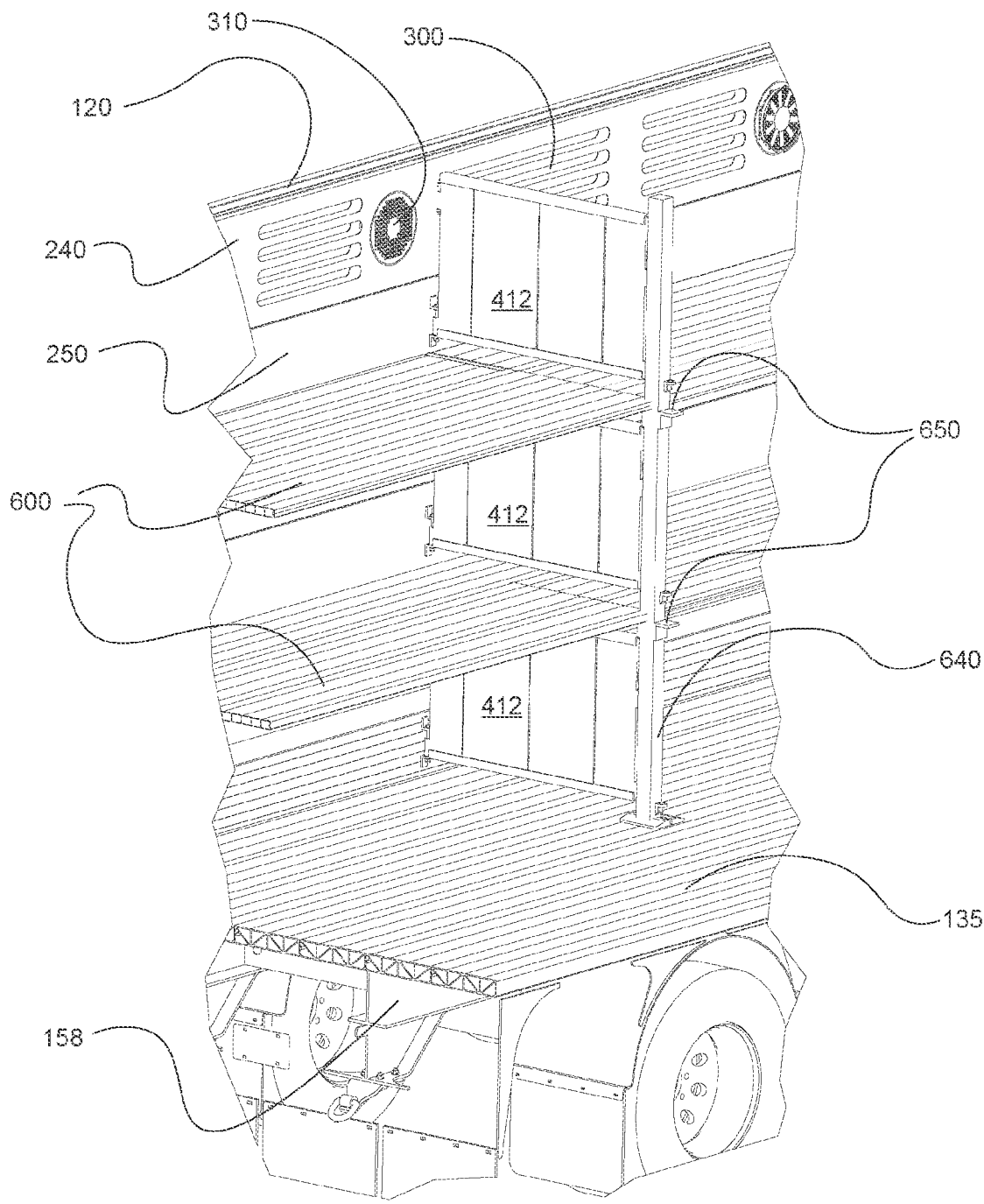
FIG. 11 shows a perspective, partial, cross-sectional version of the trailer of FIG. 7, showing the convertible platforms on one side of the container, with the convertible platforms and sidewall on the other side of the container removed.
Figure 17:
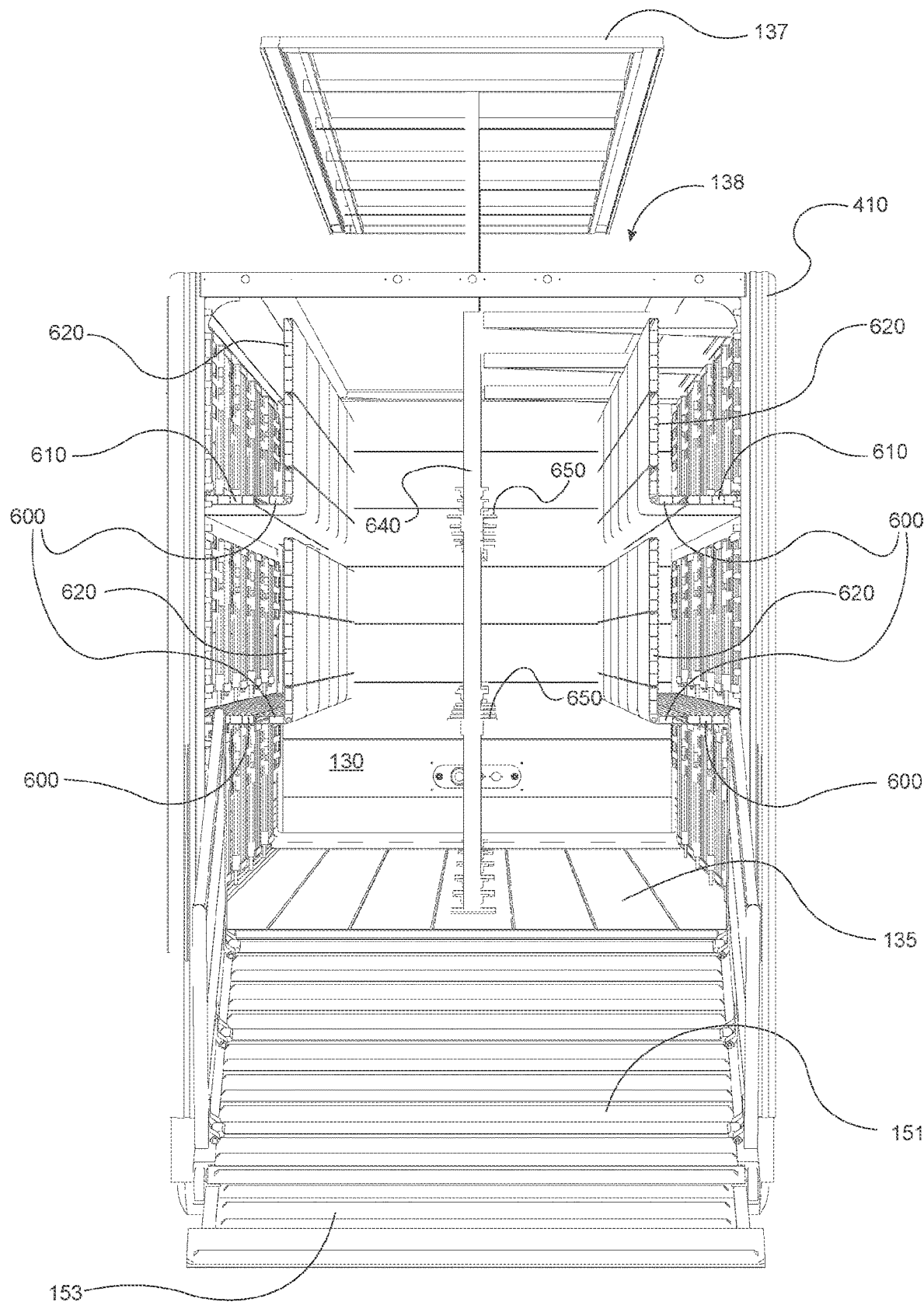
FIG. 17 shows a rear view of the trailer of FIG. 7, with the tailgate and roof open, and all convertible platforms in a stored position.
Figure 18:
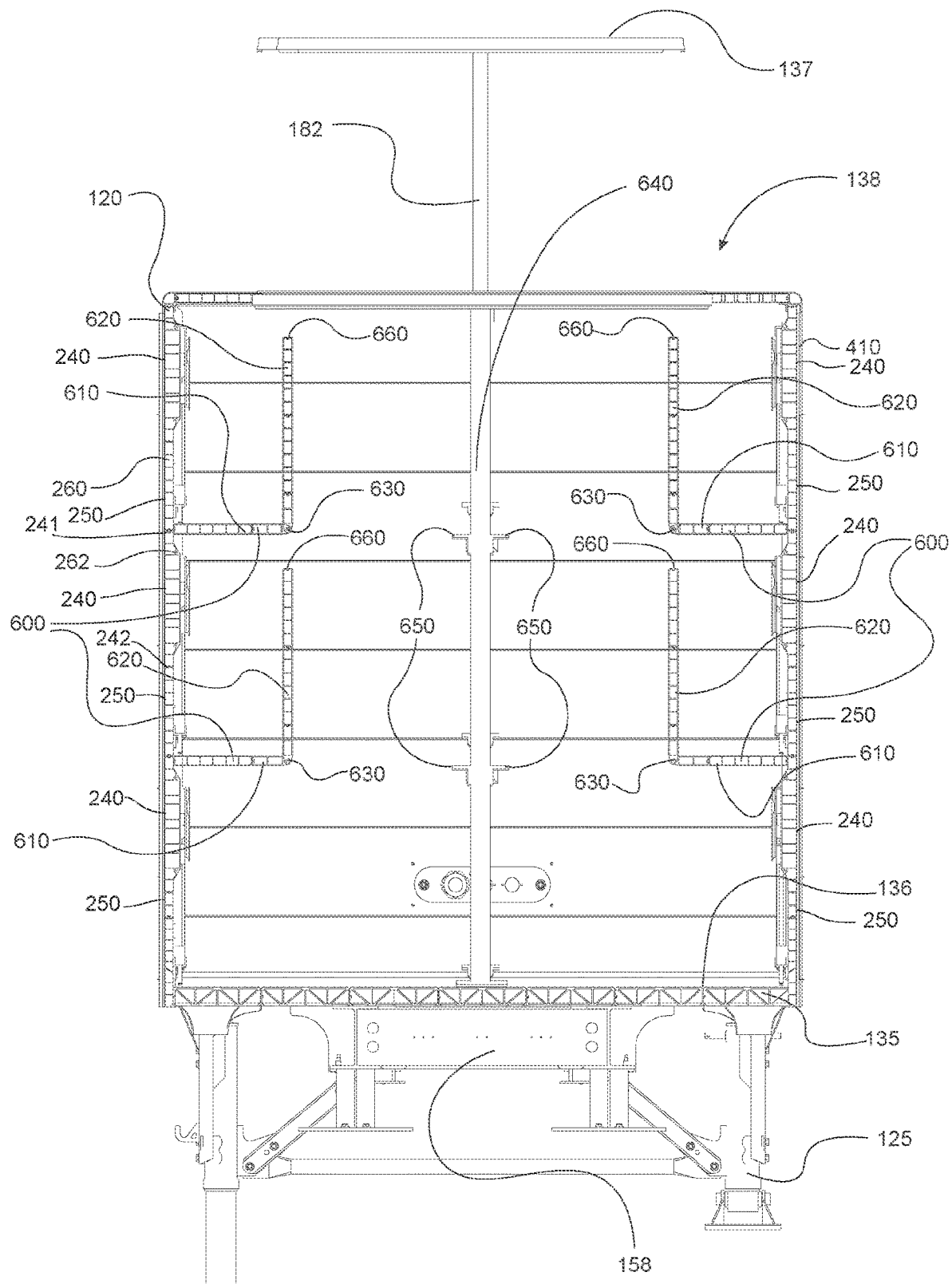
FIG. 18 is a rear, cross-sectional view of the trailer of FIG. 7 showing all convertible platforms in a stored position.

In some embodiments, as shown in FIG. 18 one or more of the ventilation panels 240 may be provided with a profile having varying thickness. For example, at the transversely opposite longitudinal edges of the ventilation panel 240—for example, upper edge 241 and lower edge 242 shown in FIG. 18—the thickness may be the same as that of respectively adjoining spacer panels 250, thereby providing a smooth transition between the respective panels. Toward a transverse center thereof, however, the ventilation panel 240 may have a greater thickness. At such thicker portion, the ventilation panel 240 may be provided with a ventilation fan opening 315 (shown in FIG. 2) having a depth sufficient to accommodate a corresponding ventilation fan 310. As shown in FIG. 18, the ventilation panel 240 profile may project inwardly, i.e. toward a transverse center of the container 110, as opposed to outwardly, thereby enabling construction of a substantially flat outside surface of the sidewall 120. In so doing, however, and by providing the thicker portion, the ventilation fan opening 315 may be made deeper, enabling accommodation of a correspondingly thicker ventilation fan 310, which would otherwise project outwardly beyond the outer surface of the sidewall 120.

Figure 19:
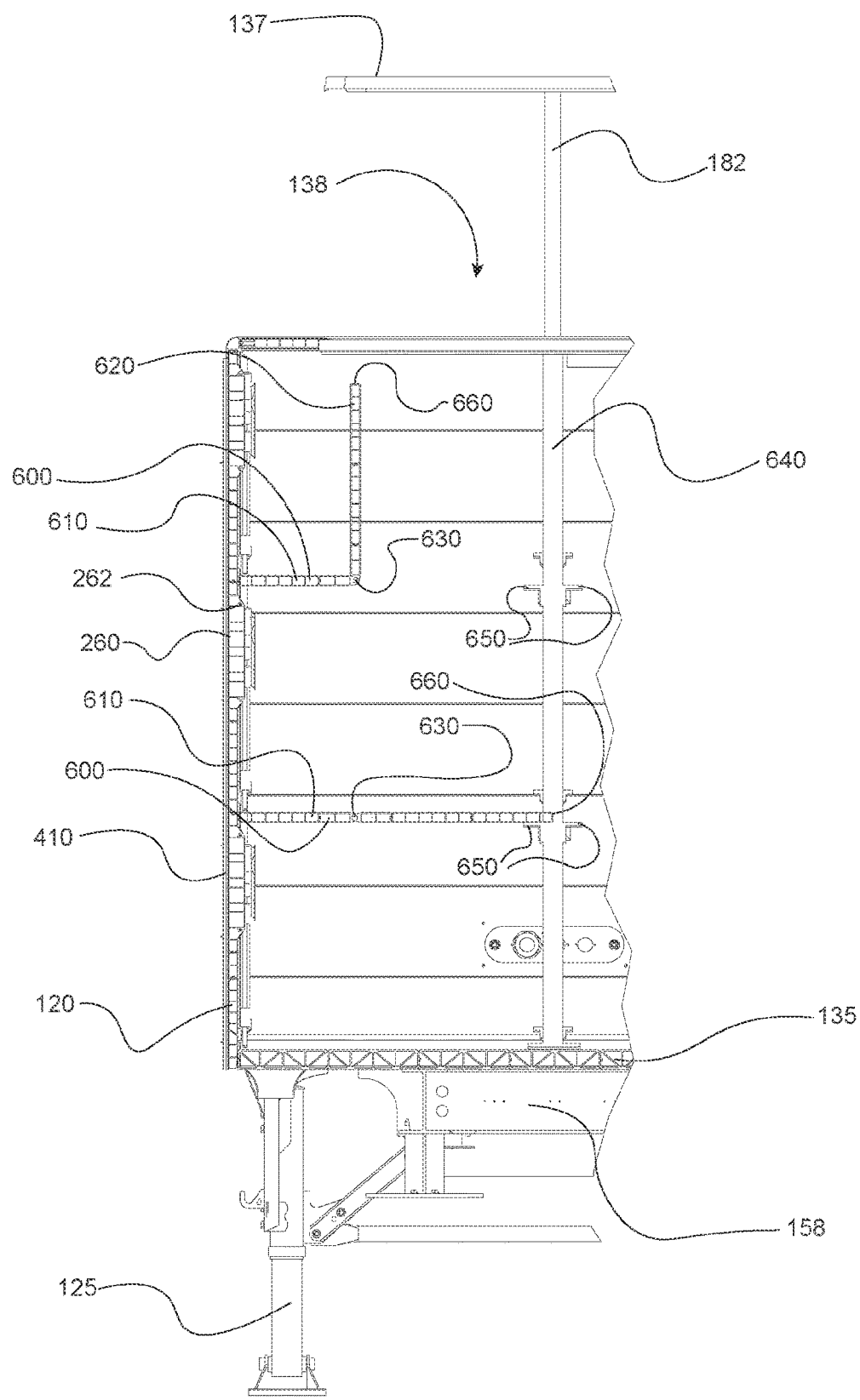
FIG. 19 is a partial, cross-sectional view of the trailer of FIG. 7 showing convertible platforms in both employed and stored positions.
Figure 20:
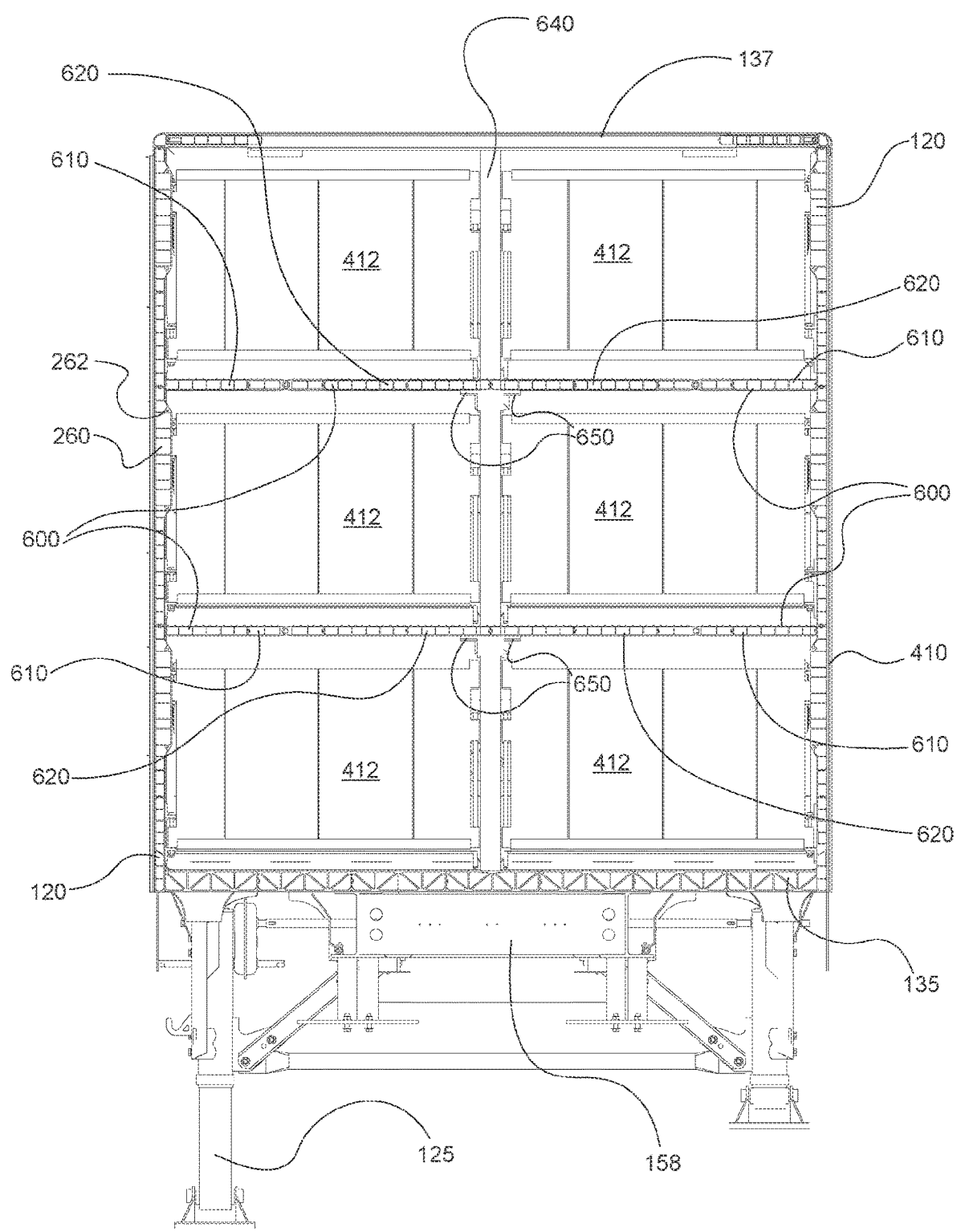
FIG. 20 is a rear, cross-sectional view of the trailer of FIG. 7, with all convertible platforms in deployed positions, and all compartment gates in closed positions.
Figure 21:
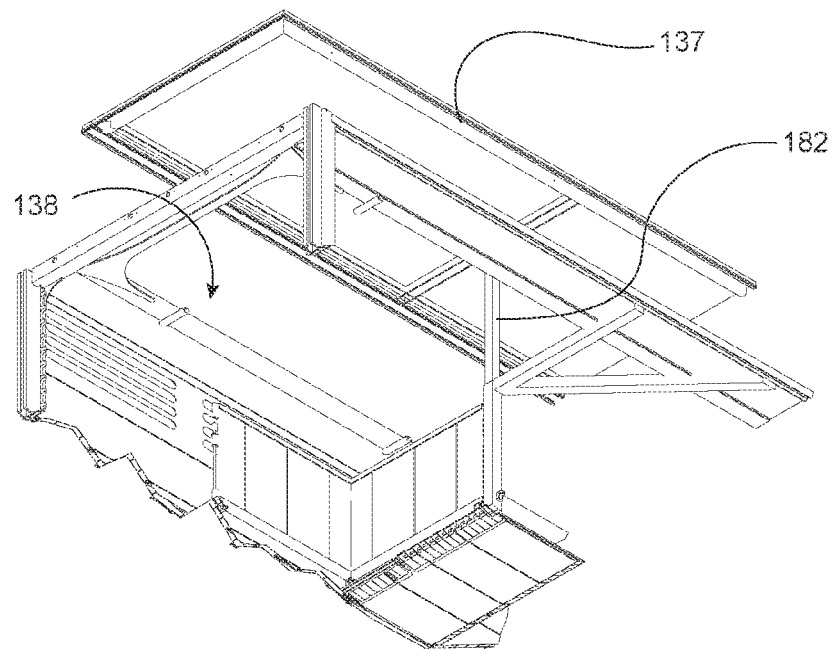
FIGS. 21 and 22 show partial perspective and side views, respectively, illustrating the configuration and mounting of the roof in an open position.
Figure 22:
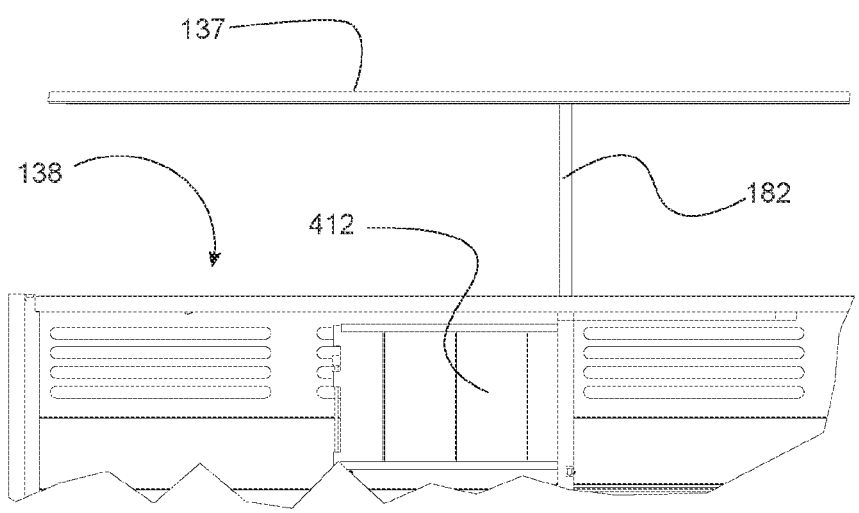

As shown in FIGS. 18-20, when the panels 200, including the ventilation panels 240 and spacer panels 250, are characterized by an extrusion axis which extends longitudinally relative to the container 110, they form a plurality of longitudinal channels 260 which extend at least some distance longitudinally, which may include an entire length of the corresponding panel 200, which may include an entire length of the container 110 if the panel 200 likewise extends an entire length of the container 110. Advantageously, one or more such channels 260 may be sized, shaped, and configured to contain and permit passage of any number of different facilities useful for operation of the trailer 100. For example, the channels 260 may be used for passage of electrical cables or pipes for the transport of fluids. For example, one or more channels 260 may accommodate electrical cables for electrical connection of one or more ventilation fans 310 to a power source, or of any other equipment such as one or more light fixtures provided at an inside surface of one or more of the sidewalls 110. The roof 137 may likewise be formed of substantially similar roof panels 265 (shown in FIG. 39), likewise forming and providing channels 260, configured, sized and shaped to accommodate electrical cables, which may be for connecting one or more light fixtures provided at an inside surface of the roof 137. As noted above, the channels 260 may similarly accommodate pipes to carry fluid for any desired purpose, including to communicate suitable fluid to animal drinking stations, misting nozzles, wash nozzles, or disinfection equipment mounted inside the container 110. The channels 260 may accommodate both electrical cables and pipes, thereby enabling functionality requiring both, including for example electrically actuated control of pipe-fed mister, wash, and disinfection systems. The floor 135 may likewise be formed of substantially similar floor panels 270 (shown in FIG. 39), likewise forming and providing channels 260, configured, sized and shaped to accommodate electrical cables or pipes or to communicate fluid directly. In particular, the channels 260 provided in the floor 135 may be connected to a source of hot fluid, such as steam, to thaw materials collected on the floor 135 which have frozen due to cold weather conditions, and more generally to facilitate cleaning the floor 135. Advantageously, the floor 135 may be extruded with an extrusion profile or otherwise provided with an anti-slip floor texture 136 or pattern configured to reduce slippage and to improve traction for the movement of persons or animals on the floor 135. Additionally, or alternatively, one or more of the panels 200 may be formed with an extrusion profile providing one or more additional channels 262, as shown in FIGS. 18-20, for example as shown in connection with ventilation panel 240, to provide for substantially similar functions and options.

As shown in FIGS. 1-7 & 25, particularly in FIGS. 2-6, one or more of the sidewalls 120 may be provided with one or more cover slide tracks 170 mounted or formed at an outside surface of the sidewall 120. For example, the cover slide tracks 170 may be welded, bolted, or riveted to the sidewall 120. Two adjacent cover slide tracks 170 may be so provided to bracket one or more sets of ventilation slots 300 and/or one or more ventilation fan openings 315, and thus ventilation fans 310. As shown particularly in FIG. 6, each such opposing cover slide track 170 may be provided with a cover slot, such that the cover slot of one cover slide track 170 opposes the cover slot of the other cover slide track 170. These opposing cover slots may be sized and shaped to slidingly accommodate corresponding opposite edges of a moveable cover 320, sized and shaped to be raised or lowered within the covers slots to selectively cover (as shown particularly in FIG. 5) or expose (as shown particularly in FIG. 4) the ventilation slots 300 and/or ventilation fans 310, as the case may be. The cover 320, one or more of the cover slide track 170, or other part of the sidewall 110 may be provided with a cover retainer device to retain the cover 320 in an open or closed position. The cover may thus be slidingly moved to selectively open or close the ventilation slots 300 and/or ventilation fans 310.

The container 110 may be provided with or formed selectively to provide multiple levels. When the livestock to be transported are sufficiently small, such as pigs or sheep, a height of the interior of the container 110 may be multiples of a height necessary to accommodate the livestock. By providing multiple levels, the container 110 may be configured to accommodate a corresponding multiple number of livestock. In general, this is accomplished by providing for each such additional level and additional floor, termed a "platform" herein to distinguish the bottommost such surface, for which the term "floor" is reserved. Each such platform is thus provided in a position some vertical distance above the floor, thereby defining a corresponding upper level, whereas the level having the floor may be termed the "bottom level". A level having such a platform as its bottom surface and an underside of the roof 137 may be term the "top level". If the container has more than two levels, then at least one will be intermediate the top and bottom levels, and it will have as its upper surface an underside of the platform of the next higher level and as its lower surface an upper surface of a platform corresponding to that level.

In some embodiments, the container 110 may be formed with one or more fixed platforms provided intermediate the floor 135 and roof 137, thereby defining a corresponding number of additional levels, e.g. if one such fixed platform is provided, the container 110 is thereby divided into two levels. While providing multiple levels with fixed platforms enables carriage of a corresponding multiple of livestock, when the container 110 is long, and thus the platforms are likewise long, and extend from the front wall 130 and rear opening 140 of the container 110, and when a height of one or more of the levels is insufficient for entry of persons without crouching, the loading and unloading of livestock from such levels is thereby made at least somewhat inconvenient and dangerous.

It is therefore advantageous to provide convertible platforms which may be selectively placed in stored or deployed positions. When in the deployed position, the platform functions as a floor, or bottom surface, for the corresponding level. When in the stored position, obstruction to movement within lower levels of the container of persons or livestock caused by the platform may be eliminated, reduced, or minimized.

FIGS. 7-24, on the one hand, and FIGS. 25-45, on the other hand, respectively show two different trailers 400, 500 which are instances of trailer 100, as described above, with different corresponding containers 410, 510, each of which is identical to container 110 except as described herein, except with different respectively different convertible platforms 600, 700.

Thus, a trailer 400 with container 410 having one or more convertible platforms 600 is shown in FIGS. 7-24. As shown particularly in FIGS. 17-20, the convertible platform 600 has a fixed portion 610 and a foldable portion 620. The fixed portion 610 is rigidly mounted at an inner surface of the sidewall 120 by any suitable structure or fasteners, which may include welds. As shown, the fixed portion 610 may extend substantially perpendicularly from sidewall 120 so as to be maintained substantially parallel to the floor 135. One or more brackets may be provided and affixed at an underside of the fixed portion 610 and at an adjacent surface of the sidewall 120 to support to fixed portion 610. The foldable portion 620 may be hingedly connected to the fixed portion 610, for example by one or more hinges 630. One or more central posts 640 may be mounted at or proximal a transverse center of the container 110, and when more than one central post 640 is provided, they may be distributed equally or unequally along the longitudinal axis of the container 110. For each corresponding convertible platform 600 one or more of the central posts 640 has a platform support ledge 650 to contactingly support a free edge 660 of the foldable portion 620 distal the hinges 630 when the foldable portion 620 is folded into the deployed position.

In the deployed position, the foldable portion 620 and the fixed portion 610 may be substantially co-planar, and both substantially parallel to the floor 135. Complementary convertible platforms 600 as described above may be provided on opposing transverse sides of the container 110 at substantially the same height above the floor 135, and thus when both such complementary convertible platforms 600 are deployed at the same time, they may together form a single, monolithic platform thereby providing a floor (that is, a platform as used herein) for a corresponding level, as described above. In particular, the foldable portion 620 may be provided or formed with an indentation where the free edge 660 of the foldable portion 620 opposes the central post 640, such that a portion of the foldable portion 620 extends further to a transverse centerline of the container 110. When the complementary convertible platform 600 is likewise configured, and then both are deployed, the respective free edges 660 of the two complementary convertible platforms 600 may meet fittingly at the transverse centerline such that the full, monolithic platform is free of any gap at the transverse centerline, or at least any such gap is reduced. Moreover, one of these free edges 660 may be formed or provided with a tongue, and the other with a groove, such that when they meet at the centerline, the tongue and groove mate fittingly thus further closing any gap and providing structural reinforcement at the joint thereby formed.

Similar to the floor 135 and its anti-slip floor texture 136, respective upper surfaces of the platforms 600, including one or both of the fixed portion 610 and the foldable portion 620, may be formed or otherwise provided with an anti-slip floor texture or pattern for the same or substantially similar purpose, i.e. to reduce slippage and to improve traction for the movement of persons or animals on the platform 600. The container 410 may also have one or more compartment gates 412 selectively closeable to form compartments along the length of the container 410. As shown, for one or more of the levels, one or more pairs of transversely opposing compartment gates 412 may be provided which are selectively closeable to divide the level into compartments. The use and advantage of the compartment gates 412 is described below.

Figure 26:
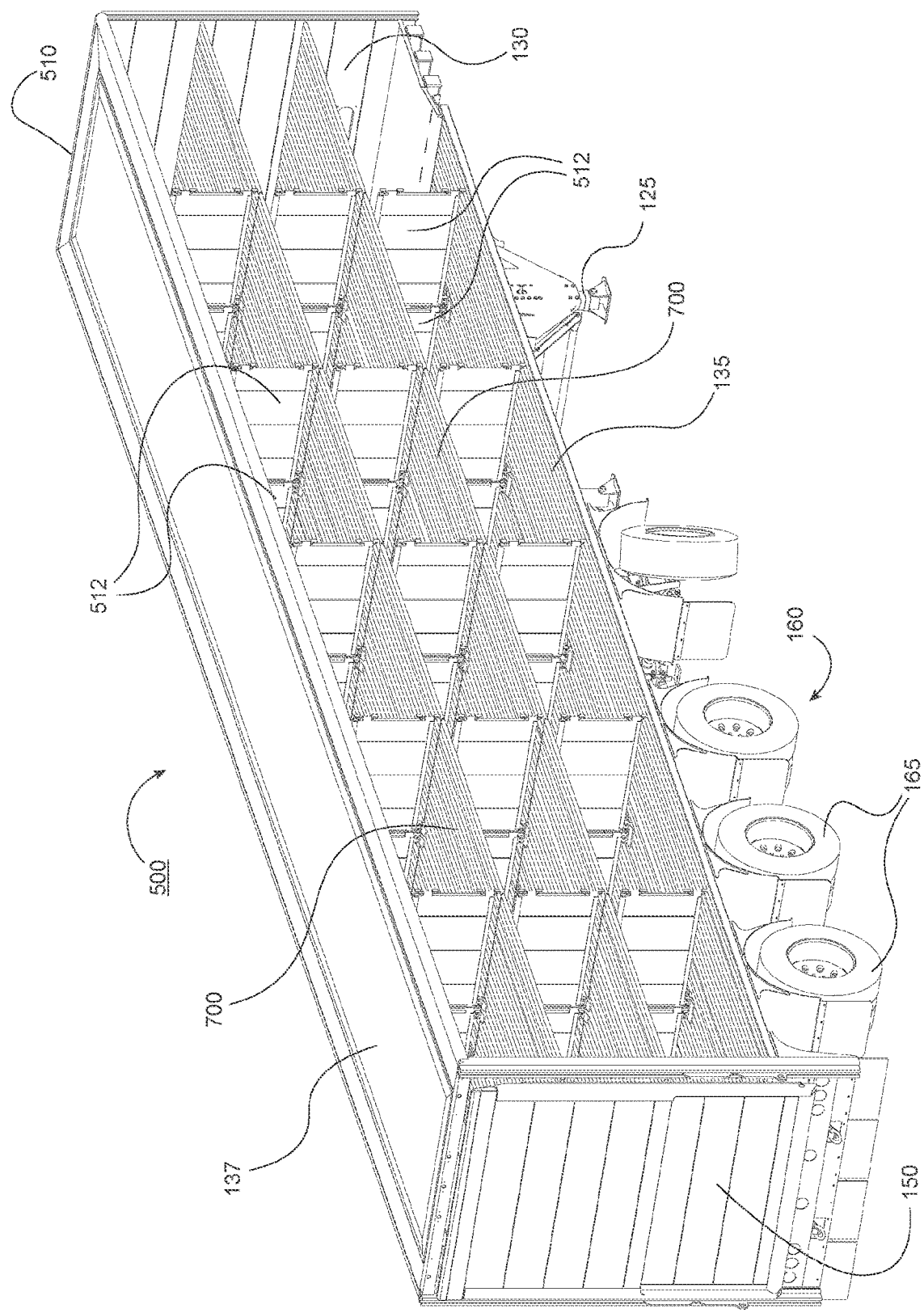
FIG. 26 shows a perspective view of the trailer of FIG. 25, with a sidewall removed to show an interior of the container, with the tailgate and roof in closed positions, all convertible platforms in deployed positions, and all compartment gates in closed positions.
Figure 27:
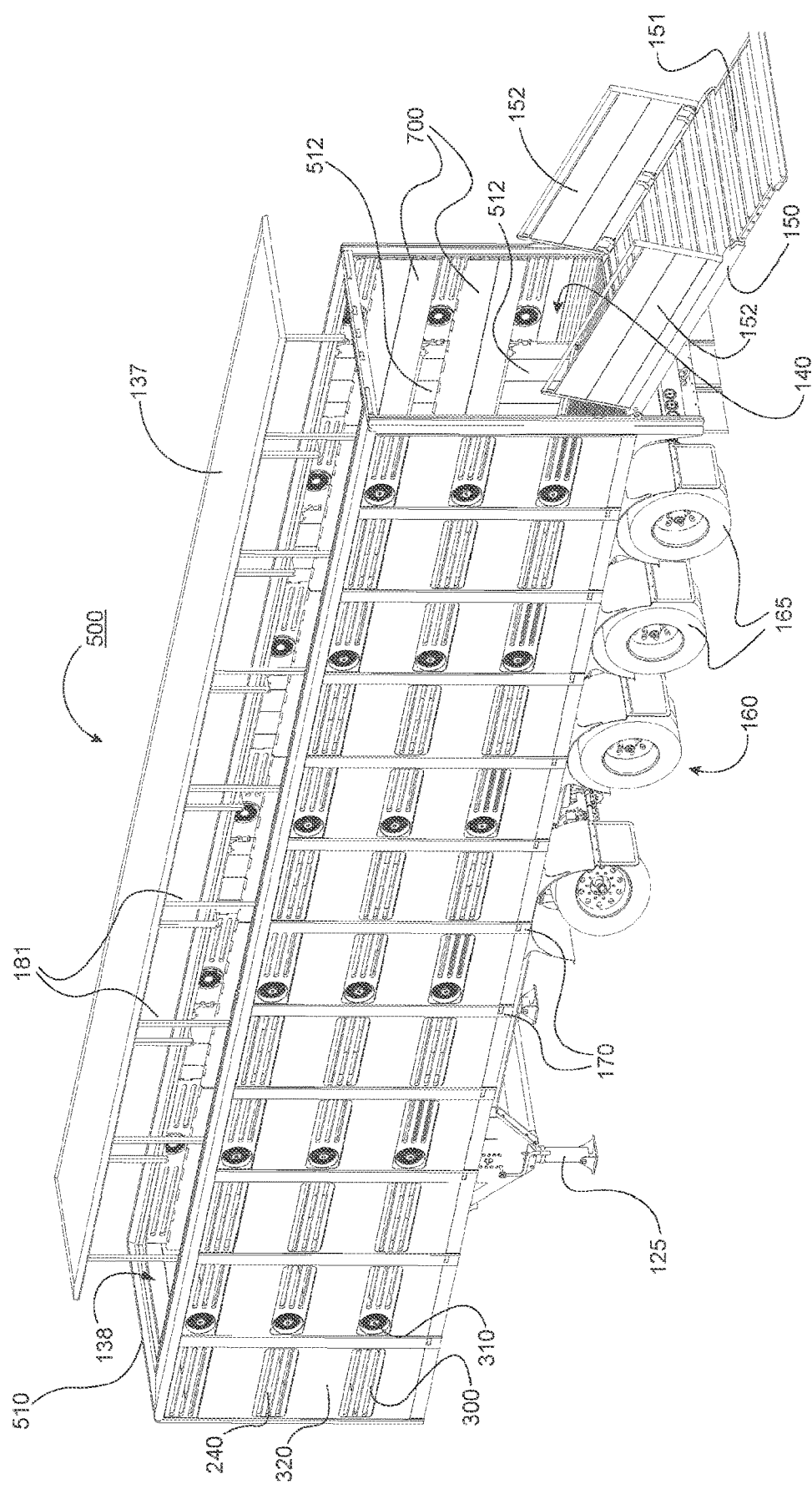
FIG. 27 shows a perspective view of the trailer of FIG. 25, with the tailgate and roof in open positions, all convertible platforms in stored positions, and all compartment gates in open positions.
Figure 28:
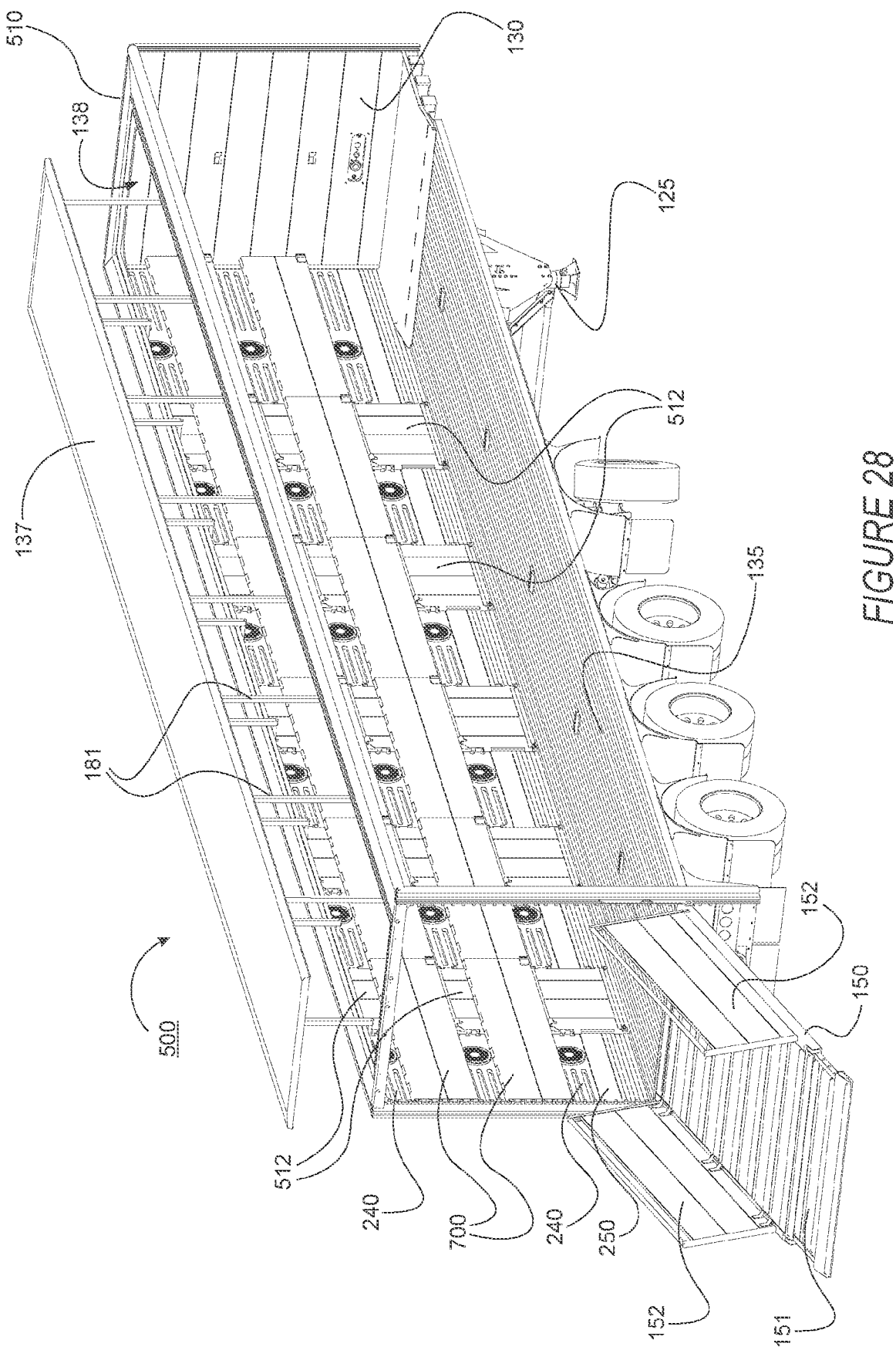
FIG. 28 shows a perspective view of the trailer of FIG. 25, with a sidewall removed to show an interior of the container, with the tailgate and roof in open positions, all convertible platforms in stored positions, and all compartment gates in open positions.
Figure 29:
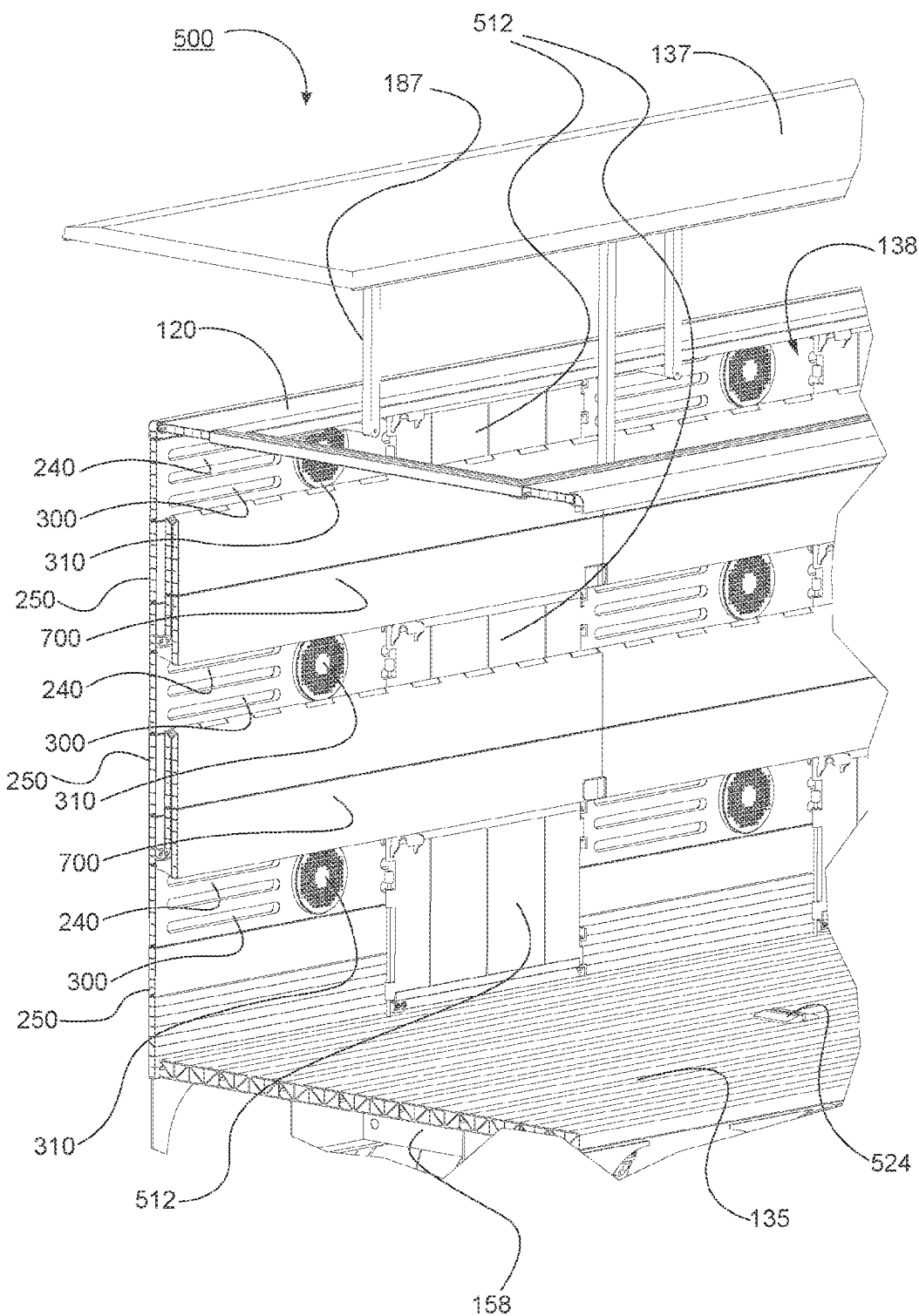
FIG. 29 shows a partial and cross-sectional version of FIG. 28.
Figure 30:
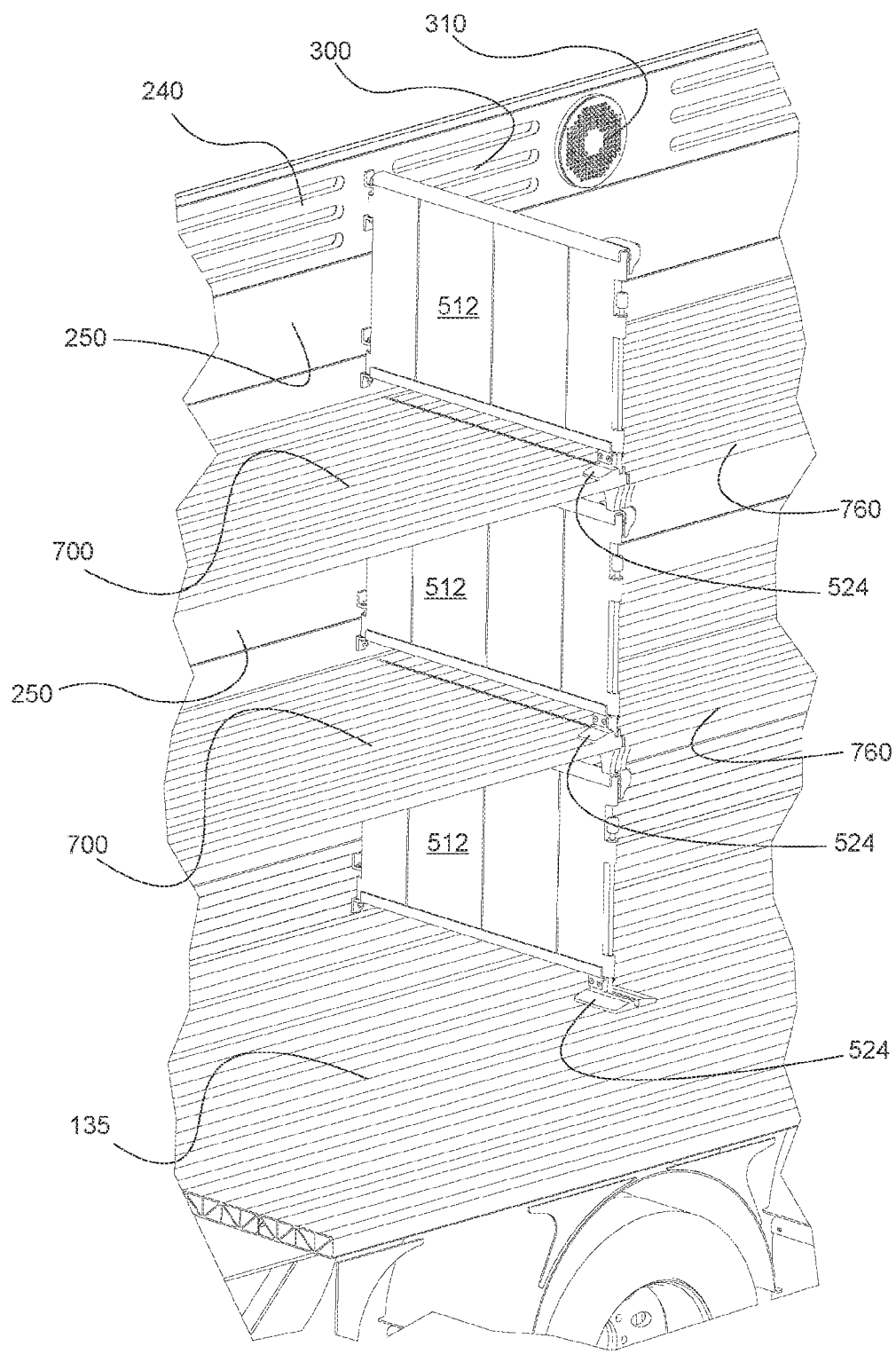
FIG. 30 shows a perspective, partial, cross-sectional version of the trailer of FIG. 25, showing the convertible platforms on one side of the container, with the convertible platforms and sidewall on the other side of the container removed.
Figures 34, 35:
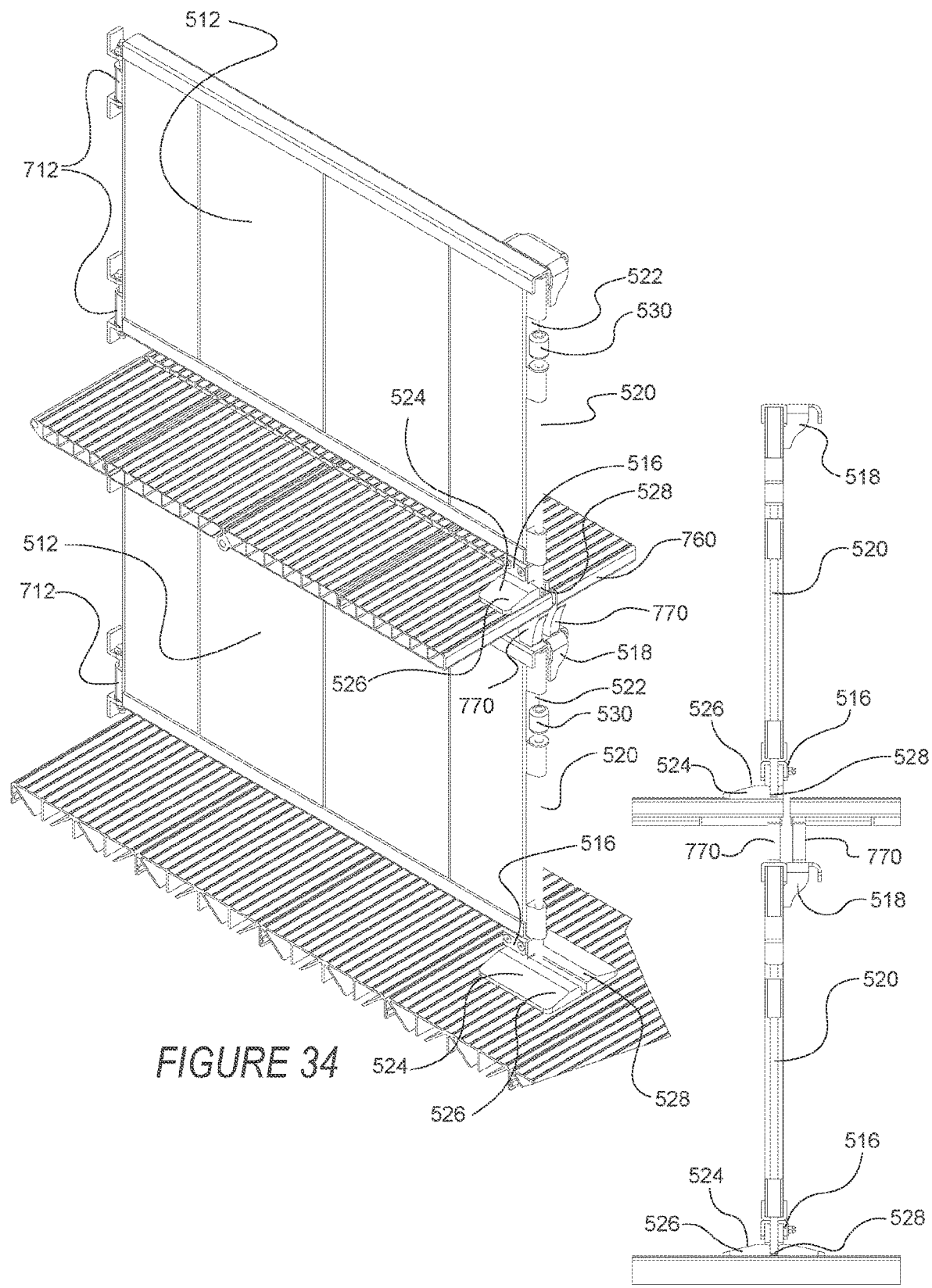
FIG. 34 is a perspective, isolated view of the compartment gates, convertible platforms, and retention device arrangement.
FIG. 35 is a corresponding side view.
Figure 36:
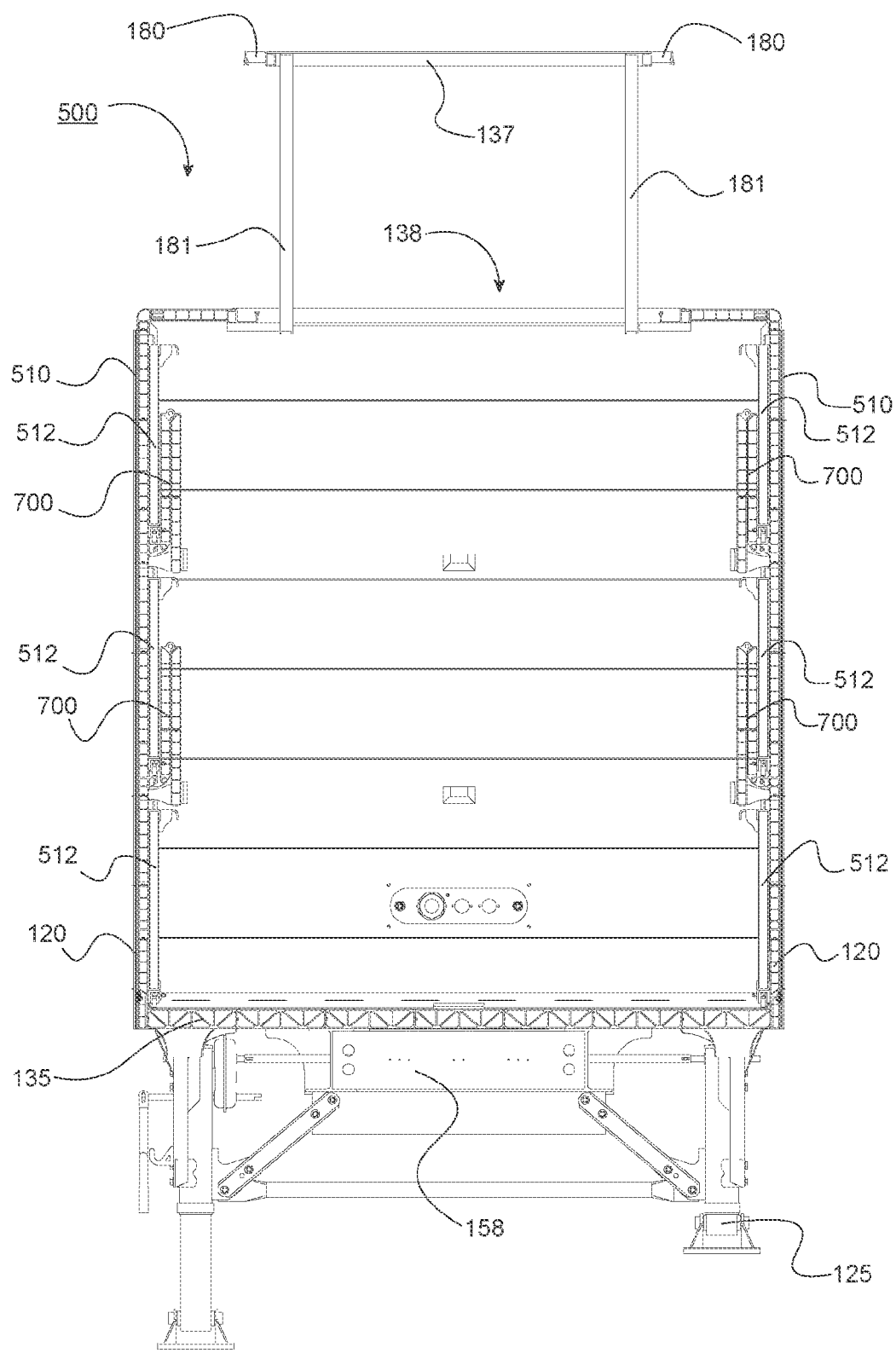
FIG. 36 shows a rear, cross-sectional view of the trailer of FIG. 25 showing all convertible platforms in a stored position.

Another trailer 500 with container 510 having one or more convertible platforms 700 is shown in FIGS. 25-45. FIG. 26 shows the convertible platforms 700 all deployed and compartment gates 512 all closed, illustrating the multiple levels and multiple compartments thereby provided. FIG. 28 shows the convertible platforms 700 all stored and the compartment gates 512 all open.

Figures 39, 40:
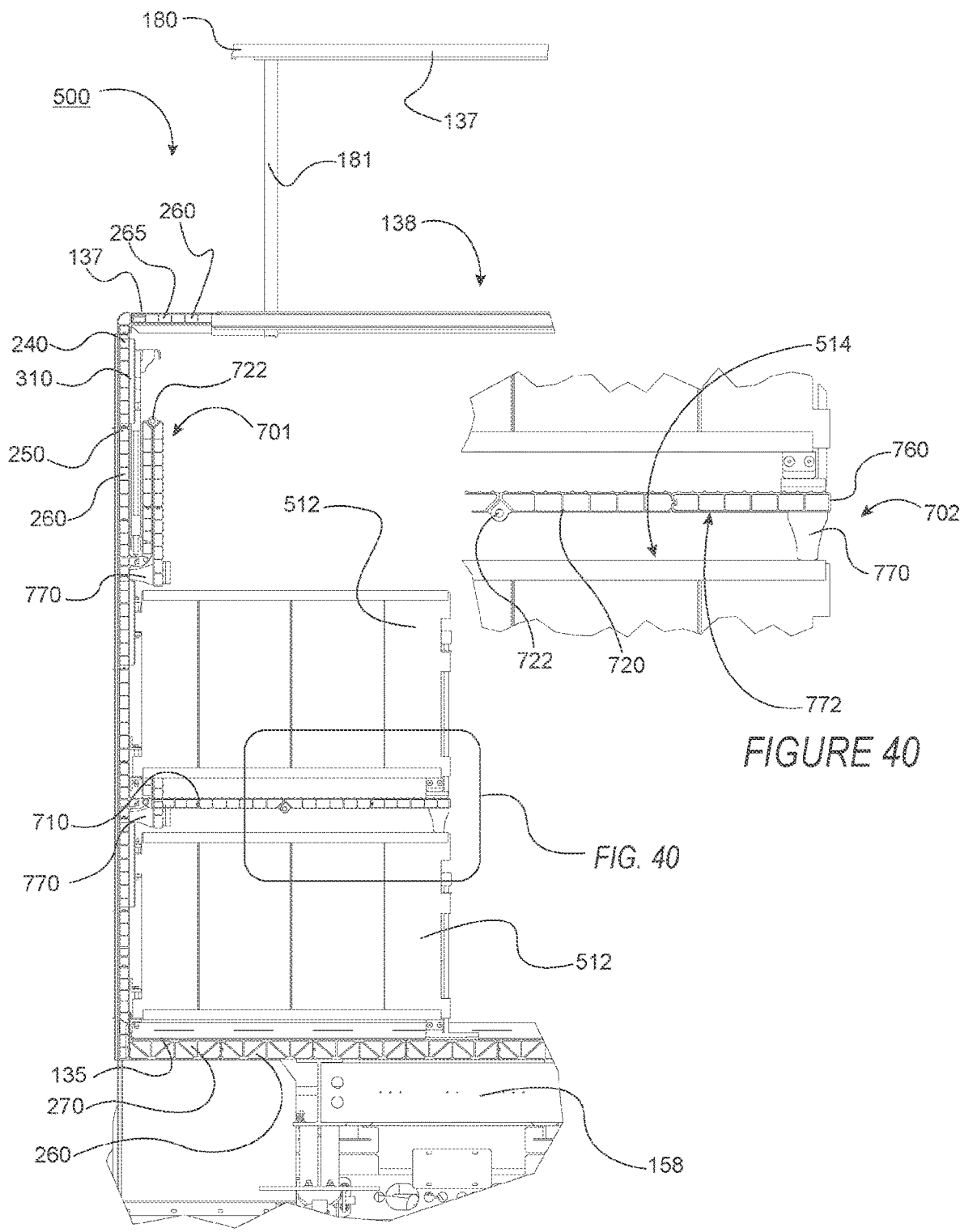
FIG. 39 is a partial, cross-sectional view of the trailer of FIG. 25 showing convertible platforms in both stored and deployed positions, and compartment gates in both open and closed positions.
FIG. 40 is an expanded view illustrating an arrangement of the convertible platforms and supporting compartment gates beneath.
Figure 41:
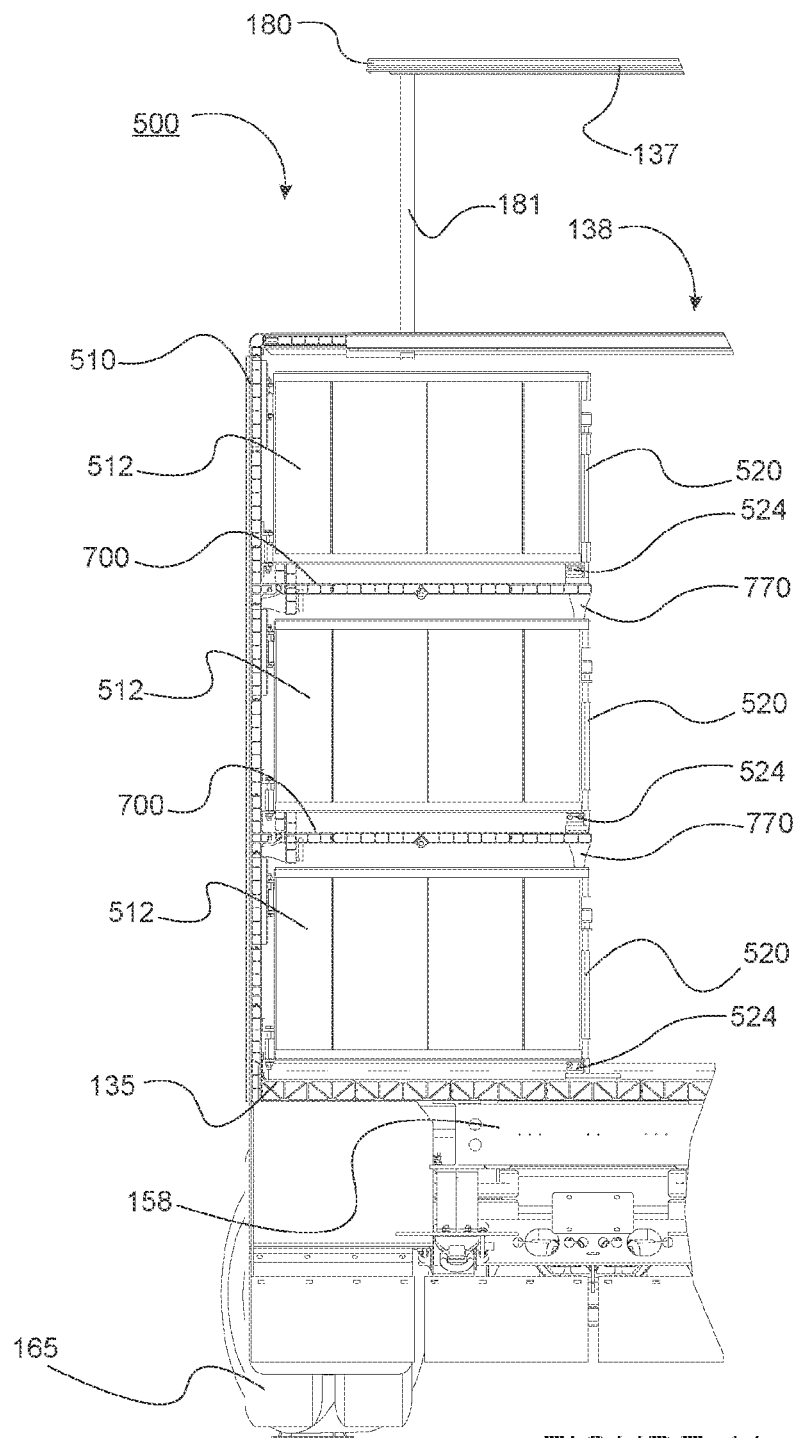
FIG. 41 and FIG. 42 show partial and full, respectively, rear, cross-sectional views of the trailer of FIG. 25, with all convertible platforms in deployed positions, and all compartment gates in closed positions.
Figure 42:
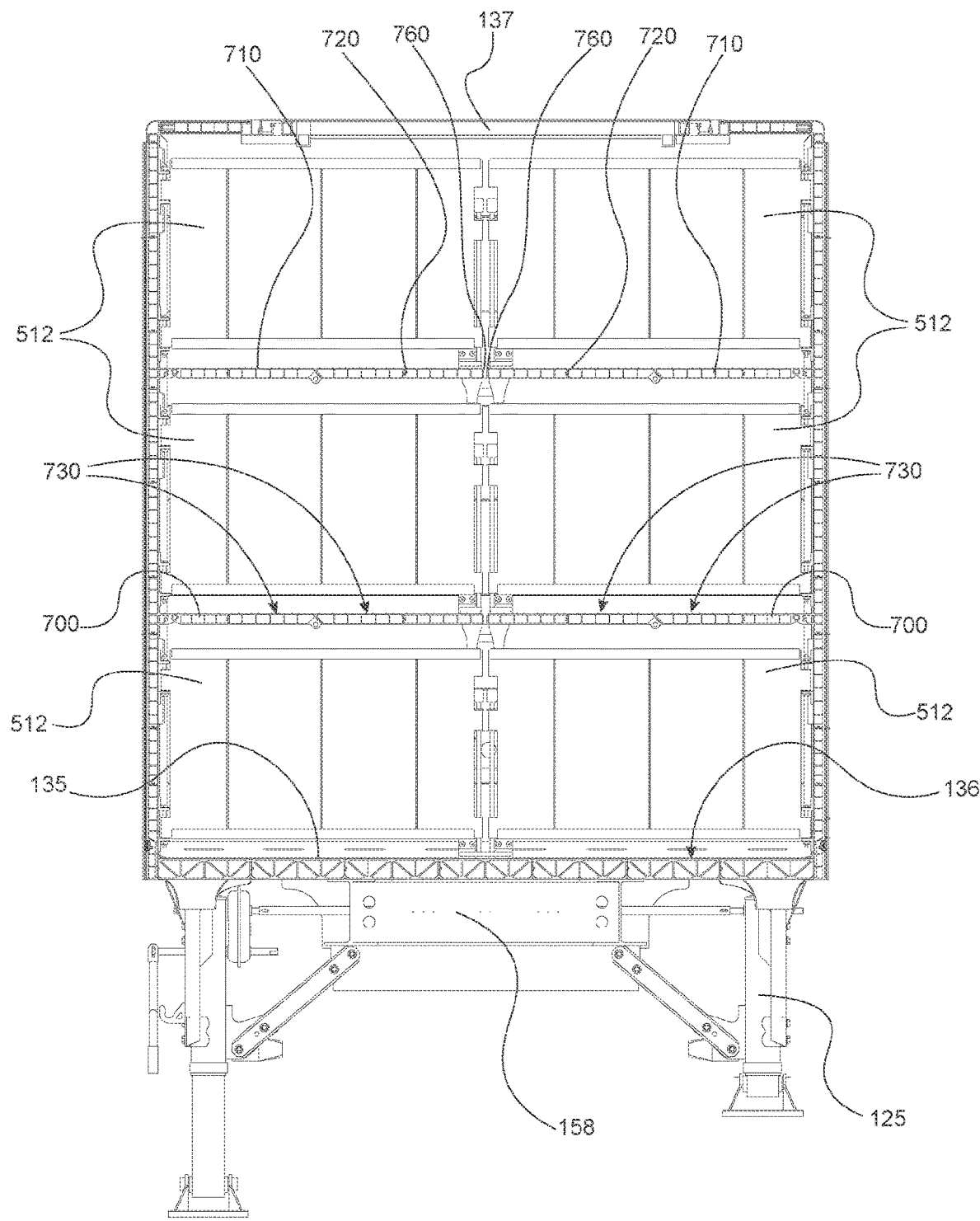
Figure 43:
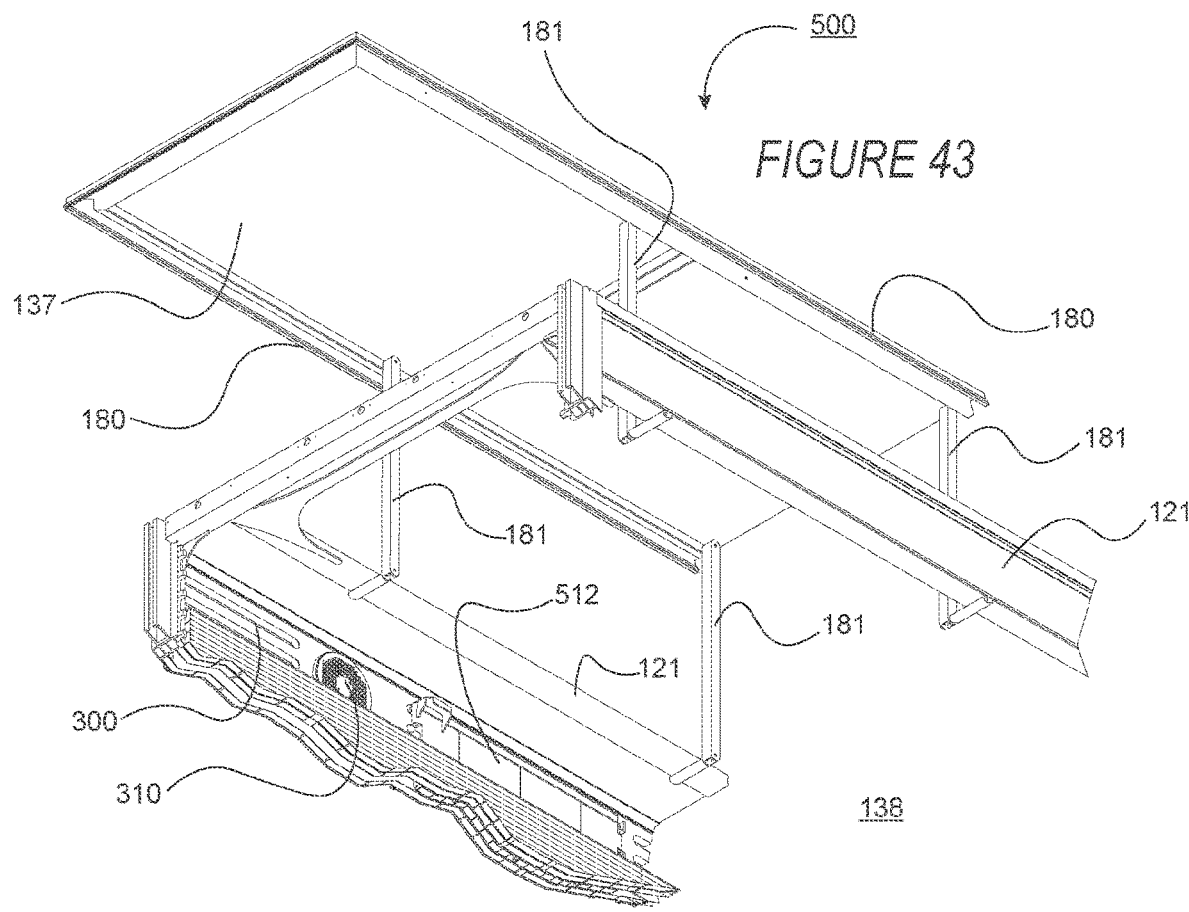
FIGS. 43 and 44 show partial perspective and side views, respectively, illustrating the configuration and mounting of the roof in an open position.
Figure 44:
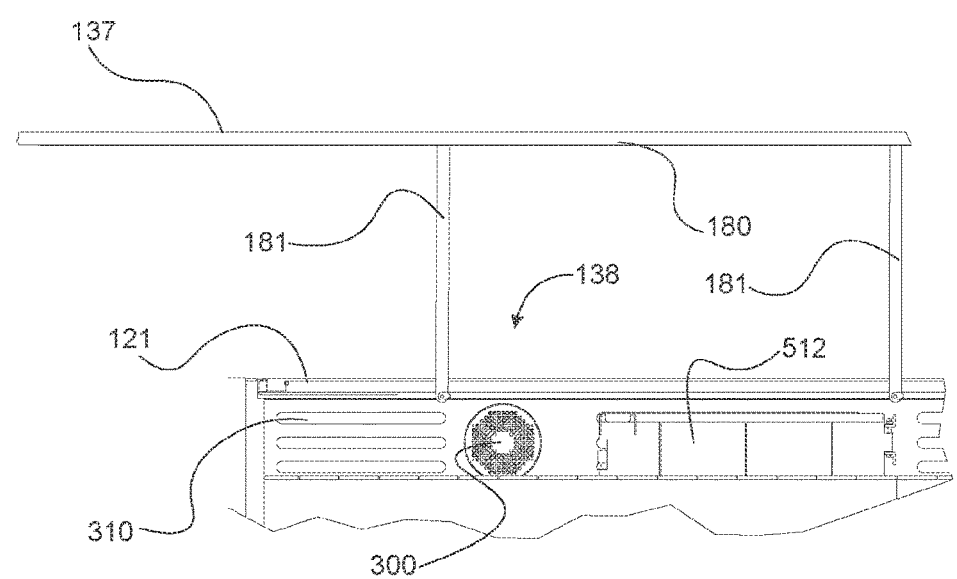
Figure 45:
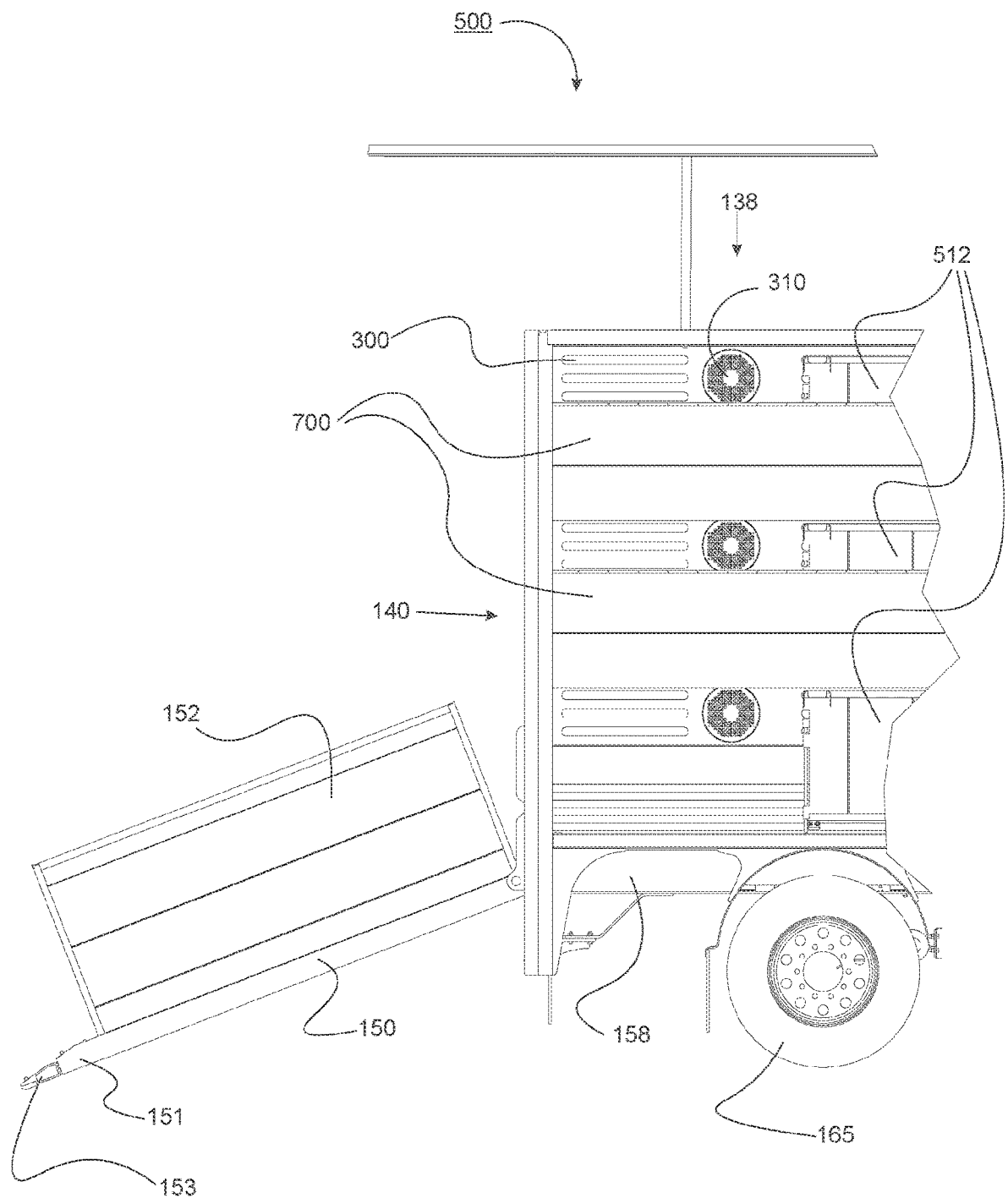
FIG. 45 shows a partial side view with a near sidewall removed to reveal an interior of the container, showing the tailgate and ramp in an open position.

As shown particularly in FIGS. 36-42, the convertible platform 700 has an outer portion 710 (distal the transverse center of the container 510) and an inner portion 720 (proximal the transverse center of the container 510) which are both foldable. The outer portion 710 is hingedly mounted at an inner surface of the sidewall 120 by hinges 712 or any other suitable structure which permits foldable movement of the outer portion 710 relative to the sidewall 120. For this purpose, the sidewall panel 200 to which the outer portion 710 is mounted may have an extrusion profile including a hinge profile with a sidewall knuckle 716 mate-able with a complementary platform knuckle 718 formed in the outer portion 710 of the convertible platform 700 to form the hinge 712 when the mated knuckles are secured with a pin. Alternatively, a knuckle may be affixed, which may be by welds, to the inner surface of the sidewall 120 for mating to the platform knuckle 718 formed in the outer portion 710 of the convertible platform 700. The inner portion 720 may likewise be hingedly mounted to the outer portion 710 with one or more hinges 722. As shown in FIG. 39, the platform 700 is thereby configured to be retractable and extensible between a stored portion 701 and a deployed position 702, in a bi-fold manner. In particular, the hinges 722 joining the outer portion 710 and inner portion 720 may be configured to prevent or resist further hinged folding beyond the deployed position, i.e. once the outer portion 710 and inner portion 720 together form a flat surface, i.e. are oriented in a common plane, while freely permitted the reverse hinged motion, i.e. reverse motion to the stored position.

Opposing pairs of platforms 700 may be provided along the length of the container 510. When the pair of platforms 700 are both deployed, respective opposing free edges 760 of the inner portions 720 of two complementary convertible platforms 700 may meet fittingly at the transverse centerline such that the full, monolithic platform is free of any gap at the transverse centerline, or at least any such gap is reduced. Moreover, one of these free edges 760 may be formed or provided with a tongue, and the other with a groove, such that when they meet at the centerline, the tongue and groove mate fittingly thus further closing any gap and providing structural reinforcement at the joint thereby formed. Alternatively, the platforms 700 may be sized and shaped such that a preconfigured gap is provided between the free edges 760.

Similar to the floor 135 and its anti-slip floor texture 136, respective upper surfaces of the platforms 700, including one or both of the outer portion 710 and the inner portion 720, may be formed or otherwise provided with an anti-slip floor texture or pattern for the same or substantially similar purpose, i.e. to reduce slippage and to improve traction for the movement of persons or animals on the platform 700.

The container 510 may also have one or more compartment gates 512 selectively closeable to form compartments along the length of the container 510, as shown particularly in FIG. 26. As shown, for one or more of the levels, one or more pairs of transversely opposing compartment gates 512 may be provided which are selectively closeable to divide the level into compartments. As shown particularly in FIGS. 39-42, for one or more of the convertible platforms 700, a corresponding compartment gate 512 disposed beneath the platform 700 may provide support to the platform by contacting a lower surface of the platform 700. The inner portion 720 of the convertible platform 700 may have a foot 770 mounted at an underside 772 of the inner portion 720 at or proximal the free edge 760 of the inner portion 720. The foot 770 and the compartment gate 512 provided beneath the convertible platform 700 may be relatively sized, shaped, and positioned such that when the compartment gate 512 is opened to an open position substantially perpendicular to the sidewall 120, and the convertible platform 700 is unfolded to the deployed position, the foot 770 may contact and rest upon an upper edge 514 of the compartment gate 512. The compartment gate 512 may further have one or more support brackets 518 provided at or near the upper edge 514 of the compartment gate 512, and extending perpendicularly from a surface of the compartment gate, i.e. toward the front wall 130 or rear opening 140 when the compartment gate 512 is in the fully open position, to provide a surface for supporting contact of a foot 770 of an adjacent convertible platform 700 when the foot 770 is otherwise than vertically above the upper edge 514 of the compartment gate 512 when that convertible platform 700 is in the deployed position. In other words, by providing the support bracket 518, the compartment gate 512 is configured to support from below both a first convertible platform 700 having a foot 770 resting on the upper edge 514 of the compartment gate as well as a second convertible platform 700 having a foot 770 resting on the upper surface of the support bracket 518. When the second convertible platform 700 is also supported in the same manner as the first convertible platform 700 by a second compartment gate 512, then it is supported by both of two compartment gates 512 respectively at or adjacent corresponding forward and rearward edges of the convertible platform 700. One or more of the support brackets 518 may also be sized and shaped so as to be operable conveniently as a handle for opening and closing the corresponding compartment gate 512.

One or more compartment gates 512 may be provided beneath a given convertible platform 700 and placed in similar arrangement. In such arrangement, the deployed convertible platform 700 is supported by the one or more compartment gates 512 from beneath where one or more feet 770 contact and rest upon the one or more corresponding compartment gates 512, as well as the one or more hinges 712 by which the outer portion 710 is mounted to the sidewall 120. As shown particularly in FIG. 32, each of the compartment gates 512 may likewise have a foot 516 sized, shaped, and configured to contact the floor 135 of the container 510, in the case of the compartment gates 512 at the bottom level, or the next lower convertible platform 700 when in the deployed position, and thus forming a floor for the level, in the case of compartment gates 512 at the upper levels. The foot 516 may include a removable, wearable pad, which may be formed of any suitable material, which may be a plastic, such as a thermoplastic. The wear pad may be mounted to the foot using any suitable fasteners, such as screws or bolts.

A gate retention mechanism may be provided to maintain the compartment gate 512 in the closed position. In particular, a retention bar 520 may be slidably mounted at an inner vertical edge 522 of the compartment gate 512, and mounted so as substantially freely to move downwardly by force of gravity. For each such retention bar 520, a retention foot 524 may be provided in the floor 135 or convertible platform 700 below, as the case may be, having a tapered slope 526 and a retention slot 528. As the compartment gate 512 is moved from the open position to the closed position, a lower end of the retention bar 520 may contact a leading edge of the tapered slope 526, and as the compartment gate 512 is further moved toward the closed position, the retention bar 520 may be lifted by wedge action between the lower end of the retention bar 520 and the tapered slope 526. Once the compartment gate 512 is moved to the fully closed position, the lower end of the retention bar 520 may be positioned over the retention slot 528 and the retention bar 520 may move downwardly by force of gravity. In such position, with the lower end of the retention bar 520 in the retention slot 528, the retention bar 520 and retention foot 516 may cooperate to prevent forward or backward motion of the retention bar 520, and thus maintain the compartment gate 512 in the fully closed position, while allowing at least some lateral motion of the lower end of the retention bar 520 within the retention slot 528. The retention bar 520 may have mounted at an upper end, or at any other suitable place, a lifting knob 530 sized and shaped to be grasped by a human hand to lift the retention bar 520 so as to raise the lower end of the retention bar 520 above the retention slot 528 thereby enabling motion of the compartment gate 512 toward the open position.

Alternatives with respect to the gate retention mechanism are possible. For example, in an alternative embodiment, the retention foot may be omitted, and instead a simple hole or other recess may be provided in the upper surface of the floor 134 or platform 700 opposing the retention foot 524 sized and shaped to receive and engage the retention foot 524 when moved above it, whereby it functions substantially similarly as the retention foot. Alternatives to the retention bar knob 530 are possible, including any sort of handle or other graspable structure to lift the retention bar 520 and its lower end out of engagement with the retention foot 524 or alterative recess, as the case may be. The gate retention mechanism may alternatively or additional be provided with a spring or other urging structure to urge the retention bar 520 downwards for more secure engagement between the foot 516 and retention 524, and/or locking means to maintain such engagement.

Although container 410 possesses many advantages over known livestock containers, the container 510 with convertible platforms 700 possesses a number of additional advantages. For example, the container 510 may be free of central posts 640, thereby eliminating any associated obstacle to the free movement of livestock, persons, or cargo. When in the stored position, the convertible platforms 700 may extend inwardly substantially less than the convertible platforms 600 with fixed portion 610, again eliminating or at least reducing obstacles to the free movement of livestock, persons, or cargo generally. As such, when the convertible platforms 700 of one or more levels is in the stored position, the container 510 may be useful for the transport of larger livestock, such as horses or cattle, which are too large to be accommodated safely in a single one of the levels. Thus, the container 510 is easily configurable for livestock of varying sizes. As shown particularly in FIGS. 28 & 29, the convertible platforms 700 and the ventilation panels 240 may be respectively sized and shaped, and relatively positioned, such that when the one or more convertible platforms 700 are in the stored position they do not block or cover the ventilation panels 240 and thus the ventilation slots 300 or ventilation fans 310 may remain unblocked. Thus, even with the convertible platforms 700 in the stored position, the container 510 may be configured to provide optimal ventilation to livestock including such noted larger livestock like horses and cattle. Moreover, when all convertible platforms 700 are in the stored position, and the compartment gates 512 are in the open position, they may provide minimal inward obstacles into the interior of the container 510, and with all covers 320 closed the container 510 may be fully enclosed and impervious to environmental factors. In such configuration, the container 510 may thus function and be useful substantially as an ordinary cargo container, i.e. for the storage and transport of general cargo other than livestock.

A number of additional advantages are obtained by containers 110, 410, 510 over known livestock containers. One ongoing requirement and problem with livestock containers concerns how to maximize cleanliness and thereby maximize hygiene and health of transported livestock, while at the same time minimizing the cost of time and materials required to sanitize the container. One factor presenting an impediment in this regard is the existence of any interior structure which serves to trap and accumulate materials such as animal waste or other contaminants and also frustrate removal by cleaning operations. The containers 110, 410, 510 disclosed herein possess a number of innovations which greatly improve sanitation results. Firstly, the sidewalls 120 and floor 135 may be formed from panels 200 as described herein which are joined by welding, including by single, continuous welds, along an entire length of abutted panels 220, thereby resulting in an optimally continuous and smooth joint, thereby eliminating or minimizing any gap or other structure capable of trapping and retaining waste. As described above, by forming the sidewalls 120 and floor 135 of extruded panels 200 forming longitudinal channels 260, optionally with additional channels 262, at least some, or all, of the structure required to provide electrical or plumbing connections that would be conventionally mounted at an outer or inner surface of the sidewall may instead be contained and secreted within such channels 260, thereby minimizing or eliminating any effect that external mounting would cause. In the case of mounting in the container interior, such structures could also serve to trap and retain waste, and thus eliminating them as discussed represents a yet further improvement in hygiene and sanitation.

The trailer 100, 400, 500 may be loaded with livestock in any appropriate manner which may depend on the type of livestock. For example, for larger livestock, such as horses or cattle, it may be desirable to configure the trailer 400, 500 with a single level, as shown, for example, in FIGS. 9 & 28. In such case, all convertible platforms 600, 700 may be moved into the stored position, and all compartment gates 412, 512 may be opened. A first group of livestock may be herded up the ramp 151 into the container and toward the forward-most compartment. The forward-most compartment gates 412, 512 may then be closed. A second group of livestock may then be herded up the ramp 151 into the container and toward the next-to-forward-most compartment. The next-to-forward-most compartment gates 412, 512 may then be closed. In this way, all compartments of the bottom level may be filled with livestock sequentially. The tailgate 150 may then be closed. As noted, for larger livestock, all convertible platforms 600, 700 may be retained in the stored position to provide the livestock with adequate headroom.

For smaller livestock, such as sheep or pigs, it may be desirable to use multiple levels to thereby transport a corresponding multiple number of livestock. For each level, the multiple compartments of that level may be loaded sequentially, beginning with the forward-most compartment and ending with the rearward-most compartment, substantially as described above. The bottom level may be filled first in the above manner, followed by the second, next-to-bottom level, and so on, ending with the topmost level. Prior to filling the bottom level, all convertible platforms 600, 700 may be moved into the stored position, and all compartment gates 412, 512 may be opened. The bottom level may be filled as described above, closing the compartment gates 412, 512 sequentially as each compartment is filled. Additionally, as each compartment is filled, the convertible platforms 600, 700 above that compartment and forming its upper surface may also be closed. In this way, as each compartment of the level is filled, the next-higher level is partly prepared for filling.

Figure 23:
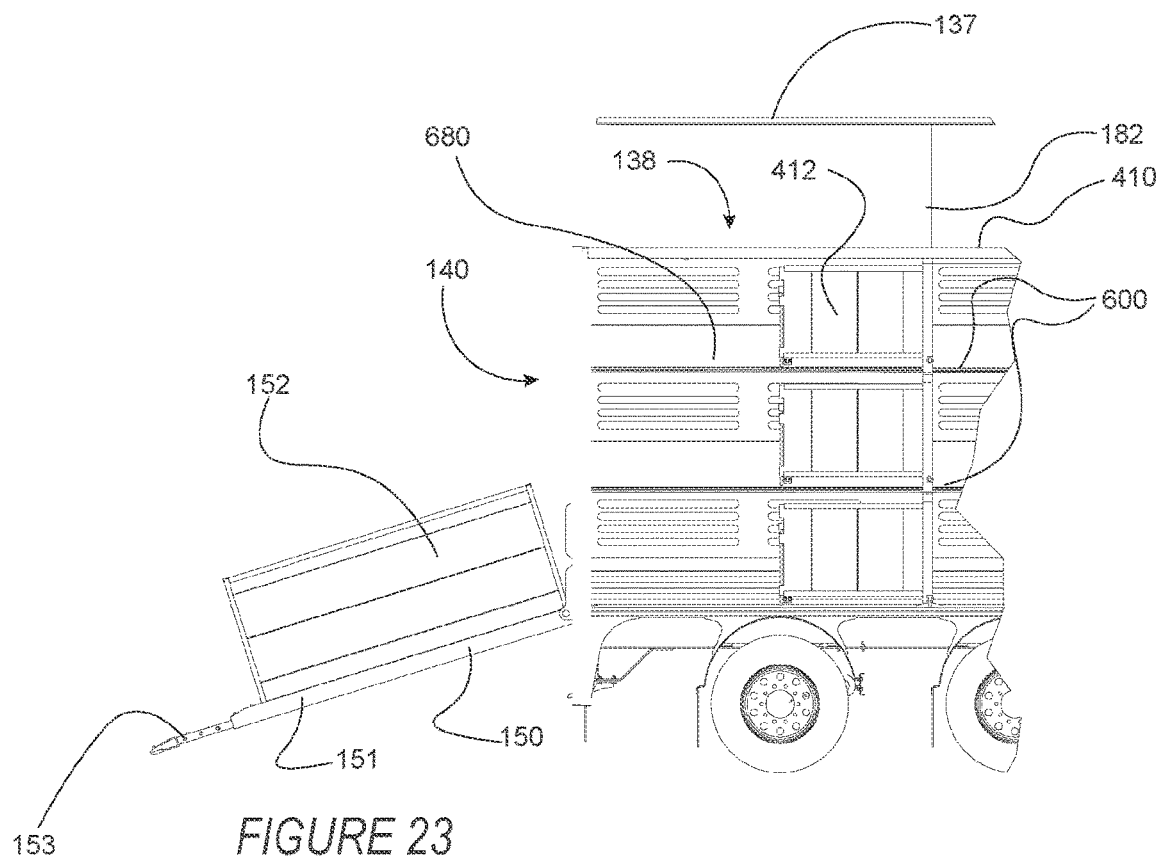
FIGS. 23 & 24 show partial side views of the trailer of FIG. 7, with a near sidewall removed to reveal an interior of the container, showing the tailgate, ramp, and ramp portion of a rear convertible platform in various positions involved in sequential loading of the different levels of the container.
Figure 24:
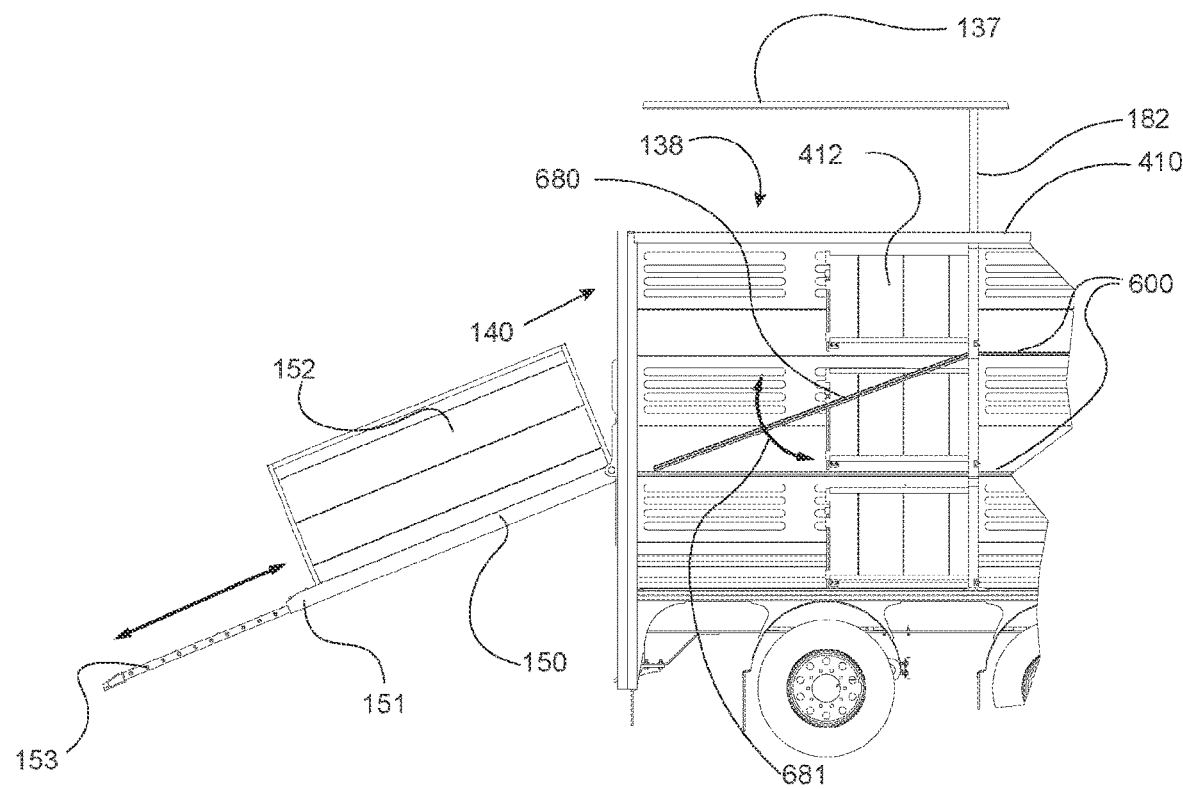
Figure 25:
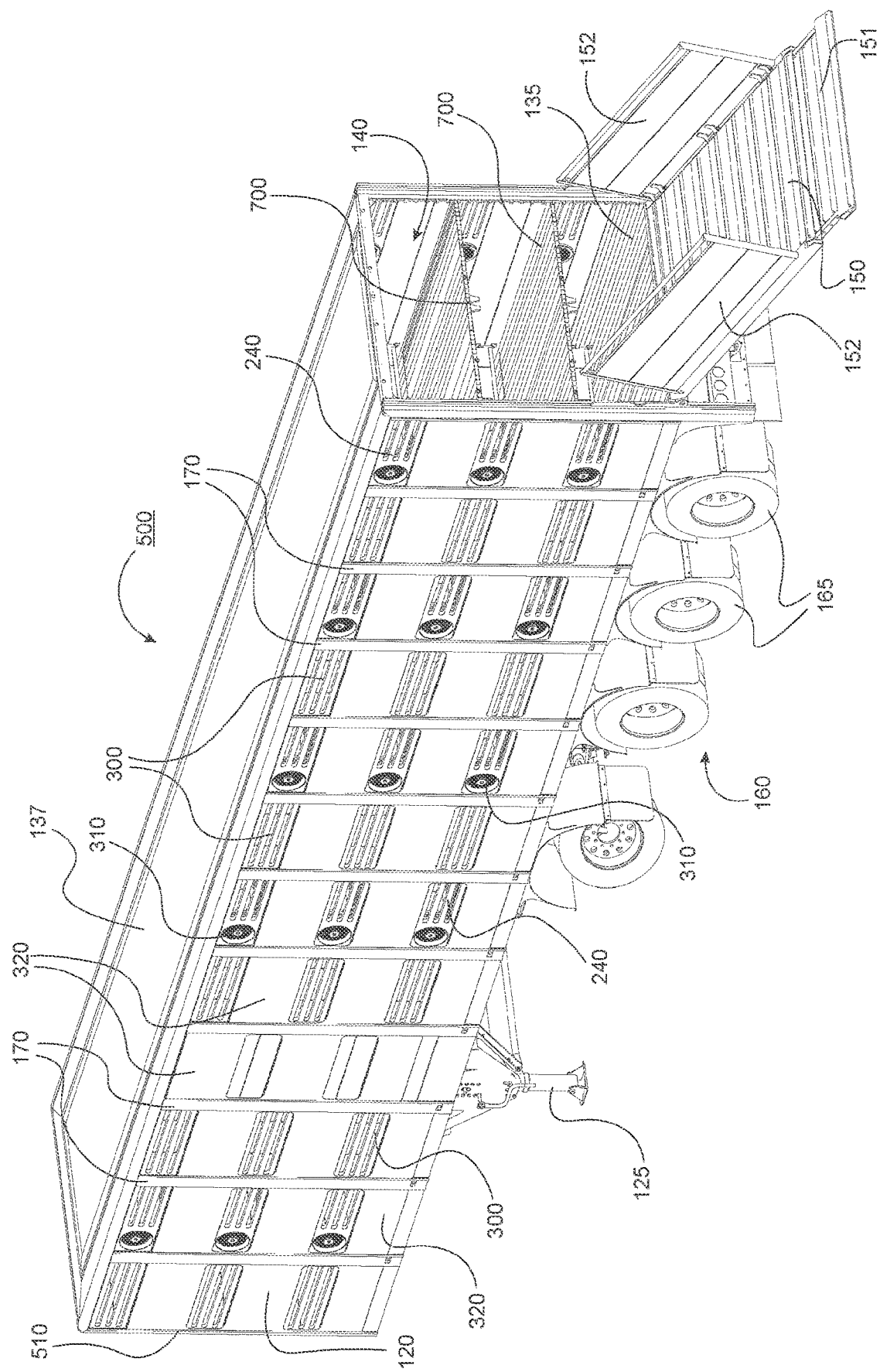
FIG. 25 shows a perspective view of an exterior of a trailer according to a second set of embodiments of the invention, with the tailgate open.

As shown particularly in FIGS. 23 & 24, such sequential loading may be facilitated by the provision of a tailgate 150 mounted to the container 410, 510, and configured and operative to be moved to different positions for loading of different ones of the levels. (While FIGS. 23 & 24 show the following features as applied to container 410, it will be understood that they are equally applicable to container 510.) In a first position of the tailgate 150, shown in FIG. 23, an upper end of the ramp 151 opens into the first, bottommost level, and an opposite end of the ramp 151 rests of the ground, thereby enabling loading of the first level. In a second position of the tailgate 150, shown in FIG. 24, the upper end of the ramp 151 opens into the second level, and the opposite end of the ramp 151 rests on the ground. The ramp 151 may include an extendable portion 153 moveable between a retracted position (shown, for example, in FIG. 45) and an extended position (shown, for example, in FIG. 24), and any degree of extension in between (shown, for example, in FIG. 23). In any case, the extendable portion 153 may be extended to a variable degree necessary or convenient for secure resting of the end of the ramp 151 on the ground. Thus, the second position of the tailgate 150 shown in FIG. 24 enables loading of the second level. The tailgate 150 may be further raised to a third position in this fashion for loading of the third level. Alternatively, a ramp portion 680 one or more of the convertible platforms 600, 700 (shown only in connection with platforms 600, but equally applicable to platforms 700) adjacent the rear opening 140 may be movable between a raised, horizontal position, shown in FIG. 23, and a lowered, sloped position, as shown in FIG. 24, as illustrated by arrow 681 in FIG. 24. In this way, the tailgate 150 and ramp 151 may be maintained in the second position to load the second level as described above, with the ramp portion 680, 780 in the raised position, and then the ramp portion 680, 780 may be lowered to the sloped position to enable loading of the third level without requiring further movement of the tailgate 150 or ramp 151.

For either trailer 400, 500 and corresponding container 410, 510, the roof 137 may be sized, shaped, and mounted for movement between a lowered position thereby closing a top opening 138 of the container 410, 510, and a raised position thereby opening the top opening 138 of the container 410, 510. The lowered position is shown, for example, in FIGS. 1, 7, 8, 25 & 26, while the raised position is shown, for example, in FIGS. 9, 27 & 28. While in the raised position, materials may be entered or removed through the top opening 138. In addition, when the roof 137 is in the lowered, closed position, there may be sufficient headroom for movement of humans in all levels, or in all but the top level. The latter may be an intentional arrangement of the trailer 400, 500 when it is intended to fill the top level with smaller animals, such as pigs or sheep, whose height is substantially less than that of humans, and dimensioning the trailer to provide adequate headroom for humans in the top level would be unnecessary during transport. In such case, it may be desirable to provide adequate headroom for humans on the top level only while the top level is being filled or empty of livestock. Thus, the roof 137 may be mounted and configured for movement into a raised, open position to provide headroom for humans, and alternatively a lowered, closed position which closes the container 410, 510 while still providing adequate headroom for the livestock.

As shown particularly in FIGS. 10, 17-19 & 21-24, the roof 137 of container 410 may be movably, particularly rotatably, mounted to the central posts 640 by one or more roof arms mounted rotatably at one end to the roof 137 and mounted rotatably at an opposite end to the central post 640. Alternatively, as shown in 29, 36, 43 & 44, the roof 137 of container 510 may be moveable mounted at or proximal transversely opposite sidewalls 120 of the container 510 by providing at or proximal the longitudinal, transversely-opposite roof edges 180 of the roof 137 a plurality of roof arms 181 each rotatably mounted at a first end of the roof arm 181 to the roof 137 at or proximal the roof edge 180 and also rotatably mounted at a second end of the roof arm 181 to a corresponding sidewall 120 at or proximal a sidewall top edge 121. The roof 137 may be mounted to the sidewalls 120 by multiple roof arms 181 in this way, such that when the roof 137 is raised the multiple roof arms 181 move in tandem to maintain the roof 137 substantially parallel to the floor 135 of the container 110. The roof arms 181 may be mounted to the roof 137 and sidewalls 120 in such positions that when the roof 137 is raised to the open position, it also moves toward the front end of the container 510, or alternatively moves toward the back end of the container 510, so as to overhang either the front end of the container or the back end of the container, respectively. One or more electric or hydraulic motors may be provided, mounted, and coupled to one or more of the roof arms 181, which are operative to selectively raise and lower the roof 137. A roof prop may be mounted to the roof 137 or one or both of the sidewalls 120 to prop the roof 137 in the raised, open position. A roof lock may be provided to maintain the roof 137 is the lowered, closed position. The roof arms 181 may be sized and shaped, and in particular provided with a preconfigured length, such that when in the raised, open position, so as to provide optimal headroom for humans between the deployed platforms 600, 700 of the top level and the roof 137.

The livestock container described herein may form and be used to construct a livestock trailer or a livestock railcar, by assembly with any desired additional components, as discussed hereinabove and as known in the art. In particular, while in the embodiments described above and shown in the drawings the wheeled suspension is shown as being suitable for a semi-trailer to be driven on automobile roads, in other embodiments the wheeled suspension may be suitable for railcars to be driver on railroads.

The following are examples according to the disclosure herein.

Example 1. A livestock container comprising: a floor; a roof; sidewalls spanning the floor and the roof; a front wall spanning the floor and the roof; a tailgate operative selectively to close a rear opening defined by the sidewalls, the floor, and the roof; at least one pair of convertible platforms mounted pairwise to respectively corresponding sidewalls and moveable selectively between a stored position and a deployed position to form an elevated level floor spanning the sidewalls; and a plurality of compartment doors mounted to the sidewalls moveable selectively between an open position and a closed position to form compartments.

Example 2. The livestock container of Example 1, wherein at least one of the convertible platforms is a bi-fold platform positioned to be supported from below when in the deployed position by a corresponding compartment door when in the closed position.

Example 3. The livestock container of Example 2, wherein the bi-fold platform has a foot proximal a lower edge of the bi-fold platform, and the foot is positioned to rest on an upper surface of the corresponding compartment door to support the bi-fold platform when the bi-fold platform is in the deployed position and the corresponding compartment door is in the closed position.

Example 4. The livestock container of Example 3, wherein the foot is positioned to rest on an upper edge of the corresponding compartment door to support the bi-fold platform when the bi-fold platform is in the deployed position and the corresponding compartment door is in the closed position.

Example 5. The livestock container of Example 3, wherein a support bracket is mounted proximal a top edge of the corresponding compartment door and extends forwardly or backwardly from the top edge of the corresponding compartment door, and the foot is positioned to rest on an upper surface of the support bracket to support the bi-fold platform when the bi-fold platform is in the deployed position and the corresponding compartment door is in the closed position.

Example 6. The livestock container of any one of Examples 2 to 5, wherein the bi-fold platform comprises an outer portion hingedly mounted proximal an outer edge of the outer portion at an inner surface of the corresponding sidewall, and an inner portion hingedly mounted to the outer portion proximal an inner edge of the outer portion and an adjacent outer edge of the inner portion.

Example 7. The livestock container of Example 6, wherein the outer portion is hingedly mounted to the outer portion by a hinge configured to prevent or resist hinged folding beyond the deployed position.

Example 8. The livestock container of Example 6 or 7, wherein the compartment doors are flat against the corresponding sidewalls when in the open position.

Example 9. The livestock container of any one of Examples 6 to 8, wherein the outer portion of the bi-fold platform is flat against an adjacent compartment door when the compartment door is in the open position and the bi-fold platform is in the stored position, such that the compartment door is sandwiched between the bi-fold platform and the corresponding sidewall.

Example 10. The livestock container of any one of Examples 2 to 9, substantially free of vertical posts proximal a transverse center of the container.

Example 11. The livestock container of any one of Examples 1 to 10, wherein the sidewalls are formed of longitudinally extruded sidewall panels joined pairwise at respectively abutting longitudinal edges.

Example 12. The livestock container of Example 11, wherein each extruded panel comprises an outer skin, and inner skin, and a plurality of webs spanning the outer skin and the inner skin.

Example 13. The livestock container of Example 11 or 12, wherein the sidewall panels are joined by welds.

Example 14. The livestock container of any one of Examples 1 to 13, wherein the sidewalls each comprise a plurality of ventilation slots or ventilation fan openings sized and shaped to receive respective ventilation fans.

Example 15. The livestock container of Example 14, wherein the convertible platforms are sized, shaped, and positioned such that in the stored position the ventilation slots or ventilation fan openings are unobstructed by the convertible platforms.

Example 16. The livestock container of any one of Examples 14 or 15, wherein the compartment doors are sized, shaped, and positioned such that in the open position the ventilation slots or ventilation fan openings are unobstructed by the compartment doors.

Example 17. The livestock container of any one of Examples 11 to 13, wherein at least one of the sidewall panels is a ventilation panel having at least one of a ventilation slot or a ventilation fan opening sized and shaped to receive a ventilation fan.

Example 18. The livestock container of Example 17, wherein at least one of the sidewall panels defines a longitudinal channel sized and shaped for passage of a fluid pipe or an electrical wire.

Example 19. The livestock container of Example 17, wherein the ventilation panel has the ventilation fan opening housing the ventilation fan, and at least one of the sidewall panels defines a longitudinal channel sized and shaped for passage of an electrical wire connected to the ventilation fan to power the ventilation fan.

Example 20. The livestock container of any one of Examples 1 to 19, wherein the floor is formed of longitudinally extruded floor panels joined pairwise at respectively abutting longitudinal edges forming floor joints.

Example 21. The livestock container of Example 20, wherein the floor panels are joined by welds at the floor joints.

Example 22. The livestock container of any one of Examples 1 to 21, further comprising a plurality of pairs of roof arms respectively mounted rotatably at transversely opposite longitudinal roof edges of the roof, wherein each roof arm is rotatably mounted at a first end of the roof arm to the roof at or proximal the corresponding roof edge and is rotatably mounted a second end of the roof arm to the corresponding sidewall at or proximal a sidewall top edge of the sidewall.

Example 23. The livestock container of Example 22, wherein the roof is movable to a raised position wherein the plurality of roof arms move in tandem to maintain the roof substantially parallel to the floor.

Example 24. The livestock container of Example 22 or 23, wherein the when the roof is moved to the raised position the roof moves in a forward direction so as to overhang the front wall of the container.

Example 25. The livestock container of Example 22 or 23, wherein the when the roof is moved to the raised position the roof moves in a rearward direction so as to overhang the rear opening of the container.

Example 26. A livestock trailer comprising the container of any one of Examples 1 to 25 mounted on a chassis supported by wheeled suspension.

Example 27. The livestock trailer of Example 26 when dependent on Example 20 or 21, wherein the chassis comprises a longitudinal beam having an upper surface, and at least one of the floor joints is vertically above the upper surface of the longitudinal beam.

Example 28. The livestock trailer of Example 26 or Example 27 when dependent on Example 20 or 21, wherein each extruded floor panel has an inner skin and an outer skin spanned by webs, wherein at least one of the webs is a perpendicular web perpendicularly spanning the inner skin and the outer skin, and the perpendicular web is vertically above the upper surface of the longitudinal beam.

Example 29. The livestock trailer of Example 28, wherein each extruded floor panel further comprises oblique webs obliquely spanning the inner skin and outer skin, wherein the perpendicular webs and oblique webs together define a repeating shape resembling an I superimposed on an M, as follows: .

So that the present disclosure may be more readily understood, certain terms are defined. Unless defined otherwise, all technical and scientific terms used herein have the same meaning as commonly understood by one of ordinary skill in the art to which embodiments of the invention pertain. While many methods and materials similar, modified, or equivalent to those described herein can be used in the practice of the embodiments of the present invention without undue experimentation, the preferred materials and methods are described herein.

All terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6, and decimals and fractions, for example, 1.2, 3.8, 1½, and 4¾. This applies regardless of the breadth of the range.

The terms "about" or "approximately" as used herein refer to variation in the numerical quantity that can occur, for example, through typical measuring techniques and equipment, with respect to any quantifiable variable, including, but not limited to, mass, volume, time, distance, voltage, and current. Further, given solid and liquid handling procedures used in the real world, there is certain inadvertent error and variation that is likely through differences in the manufacture, source, or purity of the ingredients used to make the compositions or carry out the methods and the like. The terms "about" and "approximately" also encompass these variations. Whether or not modified by either of the terms "about" or "approximately", the claims include equivalents to the quantities.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A livestock container comprising:
   a floor;
   a roof;
   sidewalls spanning the floor and the roof;
   a front wall spanning the floor and the roof;
   a tailgate operative selectively to close a rear opening defined by the sidewalls, the floor, and the roof;
   at least one pair of convertible platforms mounted pairwise to respectively corresponding sidewalls and moveable selectively between a stored position and a deployed position to form an elevated level floor spanning the sidewalls;
   a plurality of compartment doors mounted to the sidewalls moveable selectively between an open position and a closed position to form compartments; and
   a plurality of roof arms, wherein each roof arm is rotatably mounted at a first end of the roof arm to the roof and is rotatably mounted at a second end of the roof arm proximal a top opening of the container,
   wherein the roof is movable selectively from a lowered position to a raised position, and from the raised positioned to the lowered position, wherein the plurality of roof arms move in tandem to maintain the roof substantially parallel to the floor.

2. The livestock container of claim 1, wherein the roof is movable to the raised position wherein the roof moves in a forward direction so as to overhang the front wall of the container.

3. The livestock container of claim 1, wherein the roof is movable to the raised position wherein the roof moves in a rearward direction so as to overhang the rear opening of the container.

4. The livestock container of claim 1 further comprising a plurality of vertical posts spaced along a longitudinal axis of the container and aligned proximal a transverse center of the container, wherein each roof arm is rotatably mounted at the second end of the roof arm to a corresponding vertical post.

5. The livestock container of claim 1, wherein pairs of the roof arms are respectively mounted rotatably at transversely opposite longitudinal roof edges of the roof, wherein each roof arm is rotatably mounted at the first end of the roof arm to the roof at or proximal a corresponding roof edge, and is rotatably mounted at the second end of the roof arm to the corresponding sidewall at or proximal a sidewall top edge of the sidewall.

6. The livestock container of claim 5, substantially free of vertical posts proximal a transverse center of the container.

7. The livestock container of claim 1, further comprising at least one electric or hydraulic motor mounted and coupled to at least one of the roof arms and operative to selectively raise and lower the roof.

8. The livestock container of claim 1, further comprising a roof prop mounted to the roof or one or both of the sidewalls operable to prop the roof in the raised position.

9. The livestock container of claim 1, further comprising a roof lock operable to maintain the roof in the lowered position.

10. The livestock container of claim 1, wherein the roof arms have a preconfigured length such that a spacing between the elevated level floor and the roof when in the raised position provides headroom for humans walking on the elevated level floor.

11. The livestock container of claim 1, wherein the sidewalls are formed of longitudinally extruded sidewall panels joined pairwise at respectively abutting longitudinal edges.

12. The livestock container of claim 11, wherein each extruded panel comprises an outer skin, and inner skin, and a plurality of webs spanning the outer skin and the inner skin.

13. The livestock container of claim 11, wherein the sidewall panels are joined by welds.

14. A livestock trailer comprising the container of claim 1 mounted on a chassis supported by wheeled suspension.

15. A livestock railcar comprising the container of claim 1 mounted on a chassis supported by wheeled suspension.

* * * * *